United States Patent
Folke et al.

(10) Patent No.: US 10,200,946 B2
(45) Date of Patent: Feb. 5, 2019

(54) TRIGGER CONDITIONS FOR MEASUREMENT REPORTS FOR RELAY SELECTION

(71) Applicant: Telefonaktiebolaget LM Ericsson (publ), Stockholm (SE)

(72) Inventors: Mats Folke, Vällingby (SE); Johnny Karout, Göteborg (SE); Xinghua Song, Beijing (CN); Stefano Sorrentino, Solna (SE); Pontus Wallentin, Linköping (SE); Stefan Wänstedt, Luleå (SE); Ali Zaidi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/564,260

(22) PCT Filed: Apr. 8, 2016

(86) PCT No.: PCT/IB2016/052019
§ 371 (c)(1),
(2) Date: Oct. 4, 2017

(87) PCT Pub. No.: WO2016/162852
PCT Pub. Date: Oct. 13, 2016

(65) Prior Publication Data
US 2018/0139694 A1    May 17, 2018

(30) Foreign Application Priority Data

Apr. 9, 2015    (WO) ................ PCT/CN2015/076181

(51) Int. Cl.
*H04W 72/00* (2009.01)
*H04W 48/20* (2009.01)
(Continued)

(52) U.S. Cl.
CPC .......... *H04W 48/20* (2013.01); *H04W 40/125* (2013.01); *H04W 40/22* (2013.01); *H04W 76/14* (2018.02); *H04W 88/04* (2013.01)

(58) Field of Classification Search
CPC ... H04W 48/20; H04W 76/14; H04W 40/125; H04W 40/22; H04W 88/04; H04W 76/023
(Continued)

(56) References Cited

U.S. PATENT DOCUMENTS 8,538,411 B2 * 9/2013 Kwon ................... H04W 28/06
455/422.1
9,125,133 B2 * 9/2015 Ji .......................... H04W 48/08
(Continued)

OTHER PUBLICATIONS

PCT Notification of Transmittal of the International Search Report and the Written Opinion of the International Searching Authority, or the Declaration for International application No. PCT/IB2016/052019—dated Aug. 8, 2016.
(Continued)

*Primary Examiner* — Marceau Milord
(74) *Attorney, Agent, or Firm* — Baker Botts, LLP

(57) ABSTRACT

Systems and methods relating to the reduction of signaling for selecting or re-selecting a relay wireless device in a cellular communications network. Embodiments of a method of operation of a relay wireless device in a cellular communications network are provided. The relay wireless device is a wireless device having relay functionality. In some embodiments, the method of operation of the relay wireless device comprises receiving a relay request from a remote wireless device, wherein the remote wireless device is a wireless device desiring a connection to the cellular communications network via a relay wireless device. The method further comprises determining whether one or more criteria for responding to the relay request are satisfied and
(Continued)

responding to the remote wireless device upon determining that the one or more criteria for responding to the relay request are satisfied.

22 Claims, 17 Drawing Sheets

(51) Int. Cl.
*H04W 76/14* (2018.01)
*H04W 40/12* (2009.01)
*H04W 40/22* (2009.01)
*H04W 88/04* (2009.01)

(58) Field of Classification Search
USPC .................................................. 455/450, 13.1
See application file for complete search history.

(56) References Cited

U.S. PATENT DOCUMENTS

| | | | | |
|---|---|---|---|---|
| 9,131,482 B2 * | 9/2015 | Kwon | ................... | H04W 28/06 |
| 9,265,034 B2 * | 2/2016 | Kwon | ................... | H04W 28/06 |
| 9,392,582 B2 * | 7/2016 | Kwon | ................... | H04W 28/06 |
| 9,818,494 B2 * | 11/2017 | Lu | ........................... | G11C 29/46 |
| 9,843,986 B2 * | 12/2017 | Poitau | ................... | H04W 76/14 |
| 9,967,904 B2 * | 5/2018 | Kim | ....................... | H04W 76/14 |
| 9,974,066 B2 * | 5/2018 | Novlan | ................ | H04W 72/042 |
| 2011/0105107 A1 * | 5/2011 | Kwon | ................... | H04W 28/06 455/422.1 |
| 2011/0305290 A1 * | 12/2011 | Kim | ....................... | H04L 5/0007 375/267 |
| 2012/0178445 A1 * | 7/2012 | Dalsgaard | ............. | H04W 72/02 455/434 |
| 2013/0235804 A1 * | 9/2013 | Kwon | ................... | H04W 28/06 370/328 |
| 2014/0044036 A1 * | 2/2014 | Kim | .................. | H04W 72/0446 370/315 |
| 2014/0328329 A1 * | 11/2014 | Novlan | ............... | H04W 72/042 370/336 |
| 2016/0192420 A1 * | 6/2016 | Kim | ....................... | H04W 74/00 370/329 |
| 2016/0323865 A1 * | 11/2016 | Kwon | ................... | H04W 28/06 |
| 2017/0034799 A1 * | 2/2017 | Kim | ....................... | H04W 56/00 |

OTHER PUBLICATIONS

3GPP TR 23.779 v0.6.0; Technical Report; 3rd Generation Partnership Project; Technical Specification Group Services and System Aspects; Study on Application Architecture to Support Mission Critical Push to Talk Over LTE (MCPTT) Services (Release 13)—Mar. 2015

* cited by examiner

TRIGGER CONDITIONS FOR MEASUREMENT REPORTS FOR RELAY SELECTION

RELATED APPLICATIONS

Priority

This nonprovisional application is a U.S. National Stage Filing under 35 U.S.C. § 371 of International Patent Application Serial No. PCT/IB2016/052019 filed Apr. 8, 2016, and entitled "Trigger Conditions for Measurement Reports For Relay Selection" which claims priority to International Patent Application Serial No. PCT/CN2015/076181 filed Apr. 9, 2015, all of which are hereby incorporated by reference in their entirety.

TECHNICAL FIELD

The disclosed subject matter relates generally to telecommunications, and more particularly to relay selection and reselection in systems in which wireless devices include relay functionality.

BACKGROUND

Device-to-Device (D2D) communication is a component of many existing wireless technologies, including ad hoc and cellular networks. Examples include Bluetooth and several variants of the Institute of Electrical and Electronics Engineers (IEEE) 802.11 standards suite such as WiFi Direct. These systems operate in unlicensed spectrum.

Recently, D2D communication—alternatively referred to as "proximity based services (ProSe) Direct Communication"—has been proposed as an underlay to cellular networks to take advantage of the proximity of communicating devices and at the same time to allow devices to operate in a controlled interference environment. Typically, such D2D communication, or ProSe Direct Communication, shares the same spectrum as the cellular system by, for example, reserving some of the cellular uplink resources for D2D purposes. Allocating dedicated spectrum for D2D purposes is a less likely alternative as spectrum is a scarce resource and (dynamic) sharing between the D2D services and cellular services is more flexible and provides higher spectrum efficiency.

When sending data during D2D communication, the transmission mode may be either unicast, multicast, or broadcast. In the unicast mode, a specific User Equipment (UE) is the receiver. In the multicast mode, which can also be denoted "group-cast," a group of UEs are receivers. In the broadcast mode, all UEs are receivers.

With connectionless D2D communication, data can be sent from one device to another device without prior arrangement, thereby reducing the overhead and increasing the communication capacity, which is crucial in emergency situations. The source device transmits data to one (unicast) or more (multicast/group-cast/broadcast) other devices, without first ensuring that the recipients are available and ready to receive the data. Connectionless communication may be used for one-to-one or one-to-many communication, but it is particularly effective for multicast and broadcast transmissions and thus well-suited for broadcast and group communications. The connectionless communication may be realized, e.g., via physical layer (PHY) unicast/multicast/group-cast/broadcast transmissions. With PHY broadcast transmissions, the transmissions may still be turned into unicast/group-cast/multicast at higher layers. For example, in the Medium Access Control (MAC) layer, multicast or even unicast addresses may be used. Alternatively, if using broadcast on both PHY and MAC, multicast or unicast Internet Protocol (IP) addresses may be used at the IP layer.

When a UE is in network coverage, any D2D communication is controlled by the network nodes (such as the enhanced or evolved Node B (eNB)). Since the radio resources in a cell (especially for the uplink resources) are shared between traditional cellular communication and D2D communication, the eNB should also divide and assign the radio resources in case of D2D communication in case the UEs are in coverage. In Third Generation Partnership Project (3GPP) Release 12 (Rel-12), the ProSe UE Information message has been introduced as part of the Radio Resource Control (RRC) protocol. This message is used whenever the UE needs to inform the eNB about a need for ProSe communication or ProSe discovery. For communication, the ProSe UE Information message contains a list of ProSe destinations, and an index associated to each of these ProSe destinations. In case of multicast communication, a ProSe destination is a ProSe Layer 2 Group identity and, for unicast communication, a ProSe destination is a ProSe UE Identity. The index may later be used as a 4-bit short reference to a given group or unicast destination, e.g. as used in the MAC Buffer Status Report when transmitting data to the destination.

Moreover, a given unicast traffic session between two UEs may use either a direct communication path or an infrastructure communication path. When using the direct communication path, the data is transmitted directly between the UEs using D2D communication. On the other hand, when using the infrastructure communication path, the data is instead transmitted via the network nodes. The latter case is only available when both UEs are in coverage of the network.

A service continuity switch is the procedure to move a user traffic session from the direct communication path to the infrastructure communication path, or vice versa. In 3GPP Release 13 (Rel-13), service continuity switching will likely be included. By "direct communication path," it is meant that the transmitted packets use D2D communication (sidelink) channels. By "infrastructure communication path," it is meant that the packets use the non-D2D, legacy, physical (uplink and downlink) channels and also that the packets are transmitted over an Evolved Packet System (EPS) bearer, which is effectively a tunnel between the UE and the Packet Data Network (PDN) Gateway (P-GW) network node.

ProSe communication is introduced into 3GPP at Rel-12. One potential topic in Rel-13 would be the service continuity, i.e., service continuity between infrastructure and ProSe Direct Communication paths, where one of the scenarios is shown FIG. 1. A user traffic session is kept even when a UE goes between in coverage and out of coverage. In this scenario, the mobility is limited to one UE (UE1), and the other UE (UE2) acts as the relay between UE1 and the network (i.e., the eNB). In this scenario UE2 is defined as the "relay UE" of UE1, and UE1 is the "remote UE" of UE2.

Relays are a key feature of Long Term Evolution (LTE) Advanced (LTE-Advanced) introduced in Release 10 (Rel-10) of the LTE specifications. Early relays, in the form of repeaters, are present in legacy radio interface technologies such as the Universal Mobile Telecommunications System (UMTS) and Release 8 (Rel-8) of LTE. Relays are used to improve coverage in zones where the traffic is too light to justify the deployment of a base station or where there is no easy backhaul network access, such as road segments in rural areas. Thus, the relay deployment is traditionally done with the purpose of coverage extension, where the coverage is measured based on the desired signal received power. In LTE, the power of the received desired signal is measured using reference signals on uplink/downlink. This measurement is known as Reference Signal Received Power (RSRP), which is discussed below.

RSRP is the average power of Resource Elements (REs) that carry cell specific Reference Signals (RSs) over the entire bandwidth. RSRP is only measured on the symbols carrying RS. The typical range of RSRP is around −44 to −130 decibel-milliwatts (dBm). This measurement is used in RRC Idle/Connected, Cell Reselection/Selection, handover scenarios. Since this measures only the reference power, it can be said that this is the strength of the wanted signal but it does not give any information about signal quality. RSRP gives us the signal strength of the desired signal, not the quality of the signal. For quality of the signal information another parameter called Reference Signal Received Quality (RSRQ) is used in some cases.

Now, consider the UE-Network relaying scenario where a relay is itself a UE (relay UE) that has the capability to provide service to another UE (remote UE). In the following, relay selection and re-selection is described in view of the UE-Network relay scenario where the relay is a relay UE. Relay selection and re-selection is explained with respect to an example shown in FIG. 2 where there are two candidate relay UEs (UE1 and UE2) and an out-of-coverage, remote UE (UE3). In the case of relay selection, the remote UE (UE3) wants to reach the eNB by attaching itself to one of the relay UEs (UE1 and UE2) that can provide a desired service(s) with desired reliability. The question is under what rules/principles a relay should be selected. In the case of relay reselection, the remote UE (UE3) is already attached to one relay. However, if for some reason the serving relay cannot provide good service any longer, then another relay can be selected.

Existing technologies for relay selection/reselection are based on measurements of link quality between nodes involved in the multi-hop route. Such measurements may be reported to other nodes or to the eNB in order to assist the routing decision.

SUMMARY

Systems and methods relating to the reduction of signaling for selecting or re-selecting a relay wireless device in a cellular communications network. Embodiments of a method of operation of a relay wireless device in a cellular communications network are provided. The relay wireless device is a wireless device having relay functionality. In some embodiments, the method of operation of the relay wireless device comprises receiving a relay request from a remote wireless device, wherein the remote wireless device is a wireless device desiring a connection to the cellular communications network via a relay wireless device. The method further comprises determining whether one or more criteria for responding to the relay request are satisfied and responding to the remote wireless device upon determining that the one or more criteria for responding to the relay request are satisfied. In this manner, the number of responses sent to the remote wireless device is decreased, which, e.g., decreases interference.

In some embodiments, the one or more criteria comprise a criterion that the relay wireless device has not already responded to a relay request from the remote wireless device such that the relay wireless device does not respond to the relay request if the relay wireless device has already responded to a relay request from the remote wireless device.

In some embodiments, the one or more criteria comprise a criterion that the relay request was received on prioritized resources such that responding to the remote wireless device comprises responding to the remote wireless device upon determining that the relay request was received on prioritized resources.

In some embodiments, the one or more criteria comprise a criterion that the relay request comprises an indicator that the relay request is prioritized such that responding to the remote wireless device comprises responding to the remote wireless device upon determining that the relay request comprises an indicator that the relay request is prioritized.

In some embodiments, the one or more criteria comprise a criterion that a radio channel quality of a communication channel between the remote wireless device and the relay wireless device is better than a predefined quality threshold such that responding to the remote wireless device comprises responding to the remote wireless device upon determining that the radio channel quality of the communication channel between the remote wireless device and the relay wireless device is better than the predefined quality threshold. In some embodiments, the method further comprises decreasing the predefined quality threshold in response to receiving a predefined number of relay requests from the remote wireless device within a predefined amount of time.

In some embodiments, the method further comprises starting a timer upon receiving the relay request from the remote wireless device, incrementing a counter, decreasing the predefined quality threshold if the counter is greater than a predefined counter threshold, and repeating the steps of incrementing the counter and decreasing the predefined quality threshold upon receiving each of one or more additional relay requests from the remote wireless device. In some embodiments, the method further comprises resetting the predefined quality threshold upon either expiry of the timer or responding to one of the relay requests received from the wireless device.

In some embodiments, the one or more criteria comprise a criterion that the relay wireless device is to respond to the relay request if: (a) a radio channel quality of the communication channel between the remote wireless device and the relay wireless device is worse than a first predefined quality threshold but better than a second predefined quality threshold and (b) another relay wireless device has not already responded to the relay request from the remote wireless device within a predefined amount of time.

In some embodiments, the method further comprises incrementing a counter upon receiving the relay request from the remote wireless device, wherein the one or more criteria comprise a criterion that the relay wireless device is to respond to the relay request if the counter has reached a predefined maximum value.

In some embodiments, the method further comprises refraining from responding to the remote wireless device if the one or more criteria are not satisfied.

In some embodiments, responding to the remote wireless device comprises responding to the remote wireless device with a response that comprises an indication of one or more services provided by the relay wireless device.

Embodiments of a relay wireless device for a cellular communications network are also disclosed. The relay wireless device is a wireless device having relay functionality. In some embodiments, the relay wireless device comprises a transceiver, a processor, and memory storing instructions executable by the processor whereby the relay wireless device is operable to: receive, via the transceiver, a relay request from a remote wireless device, the remote wireless device being a wireless device desiring a connection to the cellular communications network via a relay wireless device; determine whether one or more criteria for responding to the relay request are satisfied; and respond to the remote wireless device, via the transceiver, upon determining that the one or more criteria for responding to the relay request are satisfied.

In some embodiments, a relay wireless device for a cellular communications network is adapted to receive a relay request from a remote wireless device, the remote wireless device being a wireless device desiring a connection to the cellular communications network via a relay wireless device; determine whether one or more criteria for responding to the relay request are satisfied; and respond to the remote wireless device upon determining that the one or more criteria for responding to the relay request are satisfied. In some embodiments, the relay wireless device is further adapted to perform the method of operation of the relay wireless device according to any of the embodiments disclosed herein.

In some embodiments, a relay wireless device for a cellular communications network comprises a reception module operable to receive a relay request from a remote wireless device, the remote wireless device being a wireless device desiring a connection to the cellular communications network via a relay wireless device; a determination module operable to determine whether one or more criteria for responding to the relay request are satisfied; and a response module operable to respond to the remote wireless device upon determining that the one or more criteria for responding to the relay request are satisfied.

In some embodiments, a relay wireless device for a cellular communications network comprises means for receiving a relay request from a remote wireless device, the remote wireless device being a wireless device desiring a connection to the cellular communications network via a relay wireless device; means for determining whether one or more criteria for responding to the relay request are satisfied; and means for responding to the remote wireless device upon determining that the one or more criteria for responding to the relay request are satisfied.

Embodiments of a non-transitory computer-readable medium are also disclosed, wherein the non-transitory computer-readable medium stores software executable by one or more processors of a relay wireless device in a cellular communications network, the relay wireless device being a wireless device having relay functionality, whereby the relay wireless device is operable to: receive a relay request from a remote wireless device, the remote wireless device being a wireless device desiring a connection to the cellular communications network via a relay wireless device; determine whether one or more criteria for responding to the relay request are satisfied; and respond to the remote wireless device upon determining that the one or more criteria for responding to the relay request are satisfied.

Embodiments of a computer program are also disclosed, wherein the computer program comprises instructions which, when executed by at least one processor, cause the at least one processor to carry out the method of operation of a relay wireless device according to any of the embodiments disclosed herein.

Further, in some embodiments, a carrier is provided, wherein the carrier comprises the aforementioned computer program and the carrier is one of an electronic signal, an optical signal, a radio signal, or a computer readable storage medium.

In some other embodiments, a method of operation of a relay wireless device in a cellular communications network comprises receiving a relay request from a remote wireless device, the remote wireless device being a wireless device desiring a connection to the cellular communications network via a relay wireless device; determining whether one or more criteria for reporting the relay request to a network node of the cellular communications network are satisfied; and reporting the relay request to the network node of the cellular communications network upon determining that the one or more criteria for reporting the relay request to the network node of the cellular communications network are satisfied.

In some embodiments, the one or more criteria comprise a criterion that the relay wireless device has not already reported a relay request from the remote wireless device to the network node such that the relay wireless device does not report the relay request to the network node if the relay wireless device has already reported a relay request from the remote wireless device to the network node.

In some embodiments, the one or more criteria comprise a criterion that the relay request was received on prioritized resources such that reporting the relay request to the network node comprises reporting the relay request to the network node upon determining that the relay request was received on prioritized resources.

In some embodiments, the one or more criteria comprise a criterion that the relay request comprises an indicator that the relay request is prioritized such that reporting the relay request to the network node comprises reporting the relay request to the network node upon determining that the relay request comprises an indicator that the relay request is prioritized.

In some embodiments, the one or more criteria comprise a criterion that a radio channel quality of a communication channel between the remote wireless device and the relay wireless device is better than a predefined quality threshold such that reporting the relay request to the network node comprises reporting the relay request to the network node upon determining that the radio channel quality of the communication channel between the remote wireless device and the relay wireless device is better than the predefined quality threshold.

In some embodiments, the one or more criteria comprise a criterion that a radio channel quality of a channel between the remote wireless device and a base station of the cellular communications network is better than a predefined quality threshold such that reporting the relay request to the network node comprises reporting the relay request to the network node upon determining that the radio channel quality of the channel between the remote wireless device and the base station of the cellular communications network is better than the predefined quality threshold.

In some embodiments, the one or more criteria comprise a criterion that: (a) a radio channel quality of a communication channel between the remote wireless device and the relay wireless device is better than a first predefined quality threshold and (b) a radio channel quality of a channel between the remote wireless device and a base station of the cellular communications network is better than a second predefined quality threshold such that reporting the relay request to the network node comprises reporting the relay request to the network node upon determining that (a) the radio channel quality of the communication channel between the remote wireless device and the relay wireless device is better than the first predefined quality threshold and (b) the radio channel quality of the channel between the remote wireless device and the base station of the cellular communications network is better than the predefined quality threshold.

In some embodiments, the method further comprises incrementing a counter upon receiving the relay request from the remote wireless device, wherein the one or more criteria comprise a criterion that the relay wireless device is to report the relay request to the network node if the counter has reached a predefined maximum value.

In some embodiments, the method further comprises refraining from reporting the relay request to the network node if the one or more criteria are not satisfied.

In some other embodiments, a relay wireless device for a cellular communications network comprises a transceiver, a processor, and memory storing instructions executable by the processor whereby the relay wireless device is operable to: receive, via the transceiver, a relay request from a remote wireless device, the remote wireless device being a wireless device desiring a connection to the cellular communications network via a relay wireless device; determine whether one or more criteria for reporting the relay request to a network node of the cellular communications network are satisfied; and report, via the transceiver, the relay request to the network node of the cellular communications network upon determining that the one or more criteria for reporting the relay request to the network node of the cellular communications network are satisfied.

In some embodiments, a relay wireless device for a cellular communications network is adapted to receive a relay request from a remote wireless device, the remote wireless device being a wireless device desiring a connection to the cellular communications network via a relay wireless device; determine whether one or more criteria for reporting the relay request to a network node of the cellular communications network are satisfied; and report the relay request to the network node of the cellular communications network upon determining that the one or more criteria for reporting the relay request to the network node of the cellular communications network are satisfied. In some embodiments, the relay wireless device is further adapted to perform the method of operation of the relay wireless device according to any of the embodiments disclosed herein.

In some embodiments, a relay wireless device for a cellular communications network comprises a reception module operable to receive a relay request from a remote wireless device, the remote wireless device being a wireless device desiring a connection to the cellular communications network via a relay wireless device; a determination module operable to determine whether one or more criteria for reporting the relay request to a network node of the cellular communications network are satisfied; and a reporting module operable to report the relay request to the network node of the cellular communications network upon determining that the one or more criteria for reporting the relay request to the network node of the cellular communications network are satisfied.

In some embodiments, a relay wireless device for a cellular communications network comprises means for receiving a relay request from a remote wireless device, the remote wireless device being a wireless device desiring a connection to the cellular communications network via a relay wireless device; means for determining whether one or more criteria for reporting the relay request to a network node of the cellular communications network are satisfied; and means for reporting the relay request to the network node of the cellular communications network upon determining that the one or more criteria for reporting the relay request to the network node of the cellular communications network are satisfied.

Embodiments of a non-transitory computer-readable medium are disclosed, wherein the non-transitory computer-readable medium stores software executable by one or more processors of a relay wireless device in a cellular communications network, the relay wireless device being a wireless device having relay functionality, whereby the relay wireless device is operable to: receive a relay request from a remote wireless device, the remote wireless device being a wireless device desiring a connection to the cellular communications network via a relay wireless device; determine whether one or more criteria for reporting the relay request to a network node of the cellular communications network are satisfied; and report the relay request to the network node of the cellular communications network upon determining that the one or more criteria for reporting the relay request to the network node of the cellular communications network are satisfied.

Embodiments of a computer program are also disclosed, wherein the computer program comprises instructions which, when executed by at least one processor, cause the at least one processor to carry out the method of operation of a relay wireless device according to any of the embodiments disclosed herein. In some embodiments, a carrier is provided, wherein the carrier comprises the aforementioned computer program, and the carrier is one of an electronic signal, an optical signal, a radio signal, or a computer readable storage medium.

Embodiments of a method of operation of a remote wireless device in a cellular communications network are disclosed. The remote wireless device is a wireless device that desires to establish a relay connection with a relay wireless device, and the relay wireless device is a wireless device having relay functionality. In some embodiments, the method of operation of the remote wireless device comprises ranking a plurality of candidate relay wireless devices; and reporting, to a network node of the cellular communications network, a subset of the plurality of candidate relay wireless devices based on the ranking of the plurality of candidate relay wireless devices.

In some embodiments, ranking the plurality of candidate relay wireless devices results in a ranked list of the plurality of candidate relay wireless devices, and the subset of the plurality of candidate relay wireless devices reported to the network node is a first X candidate relay wireless devices in the ranked list of the plurality of candidate relay wireless devices, where X is a predefined number. In some embodiments, X is configurable by the cellular communications network.

In some embodiments, ranking the plurality of candidate relay wireless devices comprises ranking the plurality of candidate relay wireless devices according to a predefined ranking rule, wherein the predefined ranking rule is configurable by the cellular communications network.

In some embodiments, ranking the plurality of candidate relay wireless devices comprises ranking the plurality of candidate relay wireless devices based on first information, the first information comprising at least one of a group consisting of: Device-to-Device (D2D) link measurements for respective D2D links between the remote wireless device and the plurality of candidate relay wireless devices, reported measurements of a radio channel quality of a channel between the plurality of candidate relay wireless devices and the base station of the cellular communications network, status reports of the plurality of candidate relay wireless devices, and link quality assessments.

In some embodiments, reporting the subset of the plurality of candidate relay wireless devices comprises, for each candidate relay wireless device in the subset, reporting second information regarding the candidate relay wireless device to the network node, wherein the second information reported is different than the first information based on which the plurality of candidate relay wireless devices are ranked.

Embodiments of a remote wireless device for a cellular communications network are also disclosed. The remote wireless is a wireless device that desires to establish a relay connection with a relay wireless device, and the relay wireless device is a wireless device having relay functionality. In some embodiments, the remote wireless device comprises a transceiver; a processor; and memory storing instructions executable by the processor whereby the relay wireless device is operable to: rank a plurality of candidate relay wireless devices; and report, to a network node of the cellular communications network via the transceiver, a subset of the plurality of candidate relay wireless devices based on the ranking of the plurality of candidate relay wireless devices.

In some other embodiments, a remote wireless device for a cellular communications network is adapted to: rank a plurality of candidate relay wireless devices; and report, to a network node of the cellular communications network, a subset of the plurality of candidate relay wireless devices based on the ranking of the plurality of candidate relay wireless devices. Further, in some embodiments, the relay wireless device is further adapted to perform the method of operation of the remote node according to any of the embodiments disclosed herein.

In some embodiments, a remote wireless device for a cellular communications network comprises a ranking module operable to rank a plurality of candidate relay wireless devices; and a reporting module operable to report, to a network node of the cellular communications network, a subset of the plurality of candidate relay wireless devices based on the ranking of the plurality of candidate relay wireless devices.

In some embodiments, a remote wireless device for a cellular communications network comprises means for ranking a plurality of candidate relay wireless devices; and means for reporting, to a network node of the cellular communications network, a subset of the plurality of candidate relay wireless devices based on the ranking of the plurality of candidate relay wireless devices.

Embodiments of a non-transitory computer-readable medium are also disclosed, wherein the non-transitory computer-readable medium stores software instructions executable by one or more processors of a remote wireless device in a cellular communications network, the remote wireless device being a wireless device that desires to establish a relay connection with a relay wireless device, the relay wireless device being a wireless device having relay functionality, whereby the remote wireless device is operable to: rank a plurality of candidate relay wireless devices; and report, to a network node of the cellular communications network, a subset of the plurality of candidate relay wireless devices based on the ranking of the plurality of candidate relay wireless devices.

Embodiments of a computer program are also disclosed, wherein the computer program comprises instructions which, when executed by at least one processor, cause the at least one processor to carry out the method of operation of a remote wireless device according to any of the embodiments disclosed herein. In some embodiments, a carrier is provided, wherein the carrier comprises the aforementioned computer program, and the carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
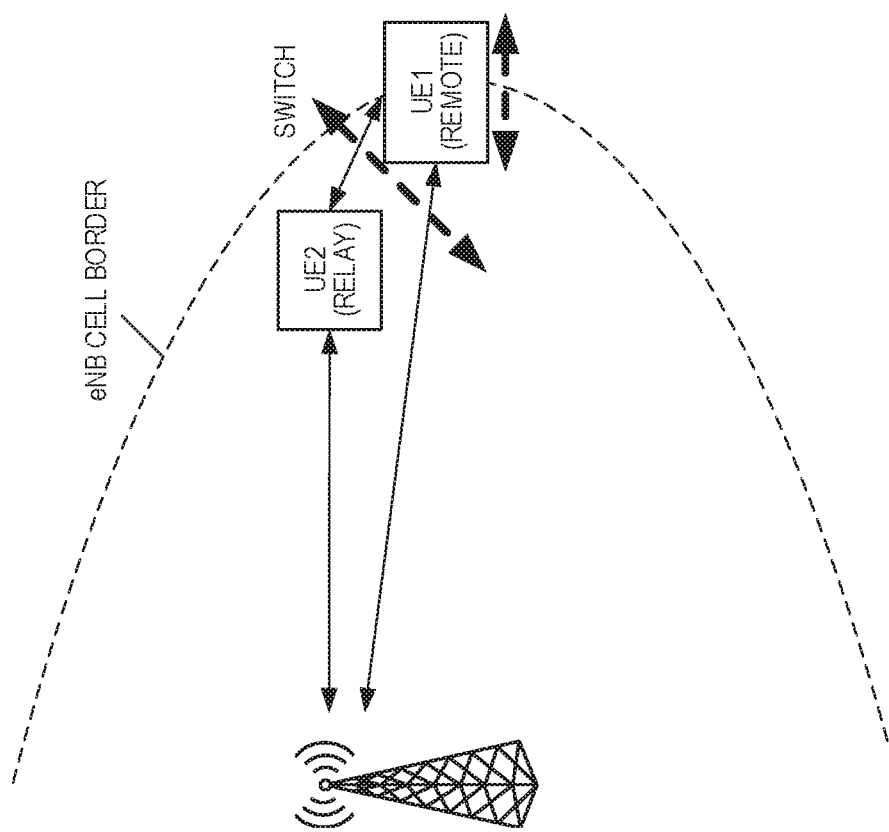
FIG. 1 shows one of the scenarios for service continuity between infrastructure and Proximity based Services (ProSe) Direct Communication paths.
Figure 2:
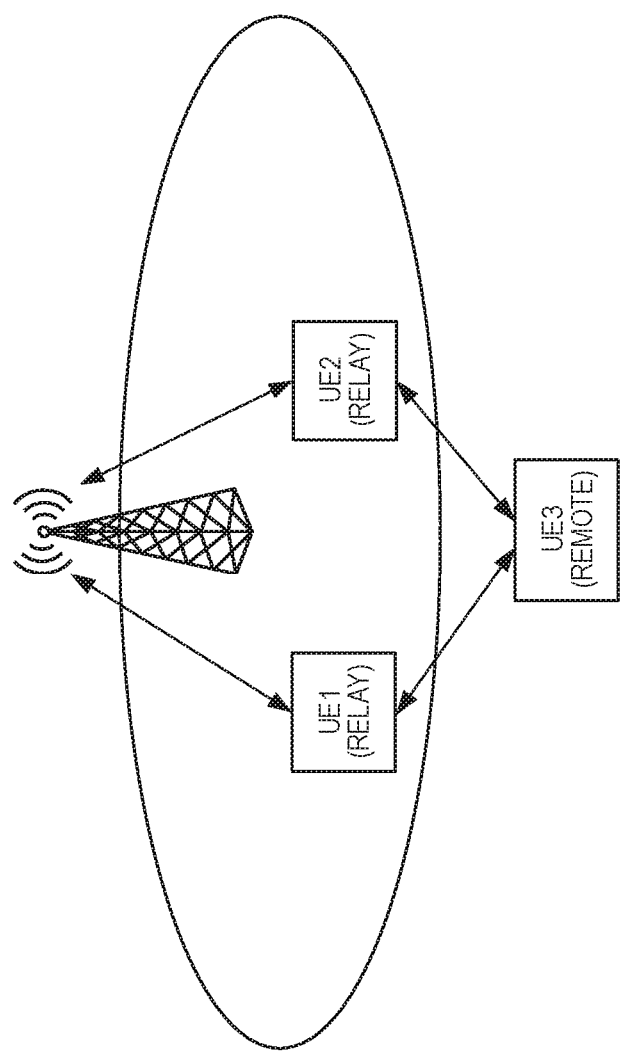
FIG. 2 shows a User Equipment (UE) Network relaying scenario, where a relay is itself a UE (relay UE) that has the capability to provide service to another UE (remote UE)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The following description presents various embodiments of the disclosed subject matter. These embodiments are presented as teaching examples and are not to be construed as limiting the scope of the disclosed subject matter. For example, certain details of the described embodiments may be modified, omitted, or augmented without departing from the scope of the described subject matter.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

In general, the disclosed subject matter provides techniques and technologies that can address and/or avoid problems that the inventors have recognized in conventional approaches. For example, certain embodiments of the disclosed subject matter address one or more of the following problems:

1. When a remote UE out of network coverage initiates a connection request to a relay UE, all relay UEs in coverage will reply to the remote UE, causing interference.
2. When a remote UE in network coverage initiates a connection request to a relay UE, all relay UEs in coverage will report this request to the eNB, causing interference.
3. When a remote UE in network coverage receives service (availability) messages from several relays, the remote UE needs to report measurements related to one or more candidate relays to the eNB. How many and which candidate relay should be reported?

For problem (1), a relay UE is configured to reply to the remote UE when certain criteria are fulfilled, such as:
the channel quality on PC5 (i.e., a radio channel between the relay UE and the remote UE) is above a certain threshold, or
there is some type of prioritization flag in message 3 (i.e., the relay request) indicating, e.g., imminent peril or an emergency, or
message 3 (i.e., the relay request) is sent on resources reserved for prioritization, e.g. imminent peril or an emergency.

The relay UE can also wait before replying to the remote UE based on channel quality, thereby letting another relay UE with better channel quality reply first.

For problem (2), a relay UE is configured to reply to the eNB (i.e., report to the eNB) when certain criteria are fulfilled, such as:
the channel quality on PC5 is above a certain threshold, or
the channel quality of Uu (i.e., the radio channel between the remote UE and the eNB) is above a certain threshold, or
there is some type of prioritization flag in message 3 indicating, e.g., imminent peril or an emergency, or
message 3 is sent on resources reserved for prioritization, e.g., imminent peril or an emergency.

For both problems (1) and (2), when the required criteria on link qualities/measurements or other status-related reports are not repeatedly fulfilled for a predefined number of attempts, the relay UE can finally reply to the remote UE declaring its availability. This is done to ensure that a remote UE does not remain unserved after a maximum number of attempts for relay selection.

For problem (3), a method ranks the candidate relays at the remote UE under a network-configured rule and reports a first "x" number of relays in the ranked list, where the number x can be configured by the network.

The described embodiments may provide various potential benefits compared to conventional approaches. For example, in certain embodiments fewer messages are sent, thereby limiting interference, reducing transmission overhead related to relay discovery, thereby improving the overall system performance. Moreover, certain embodiments ensure that there is at least one relay UE that will respond to the relay selection request under after a predefined maximum number of attempts.

Figure 3:
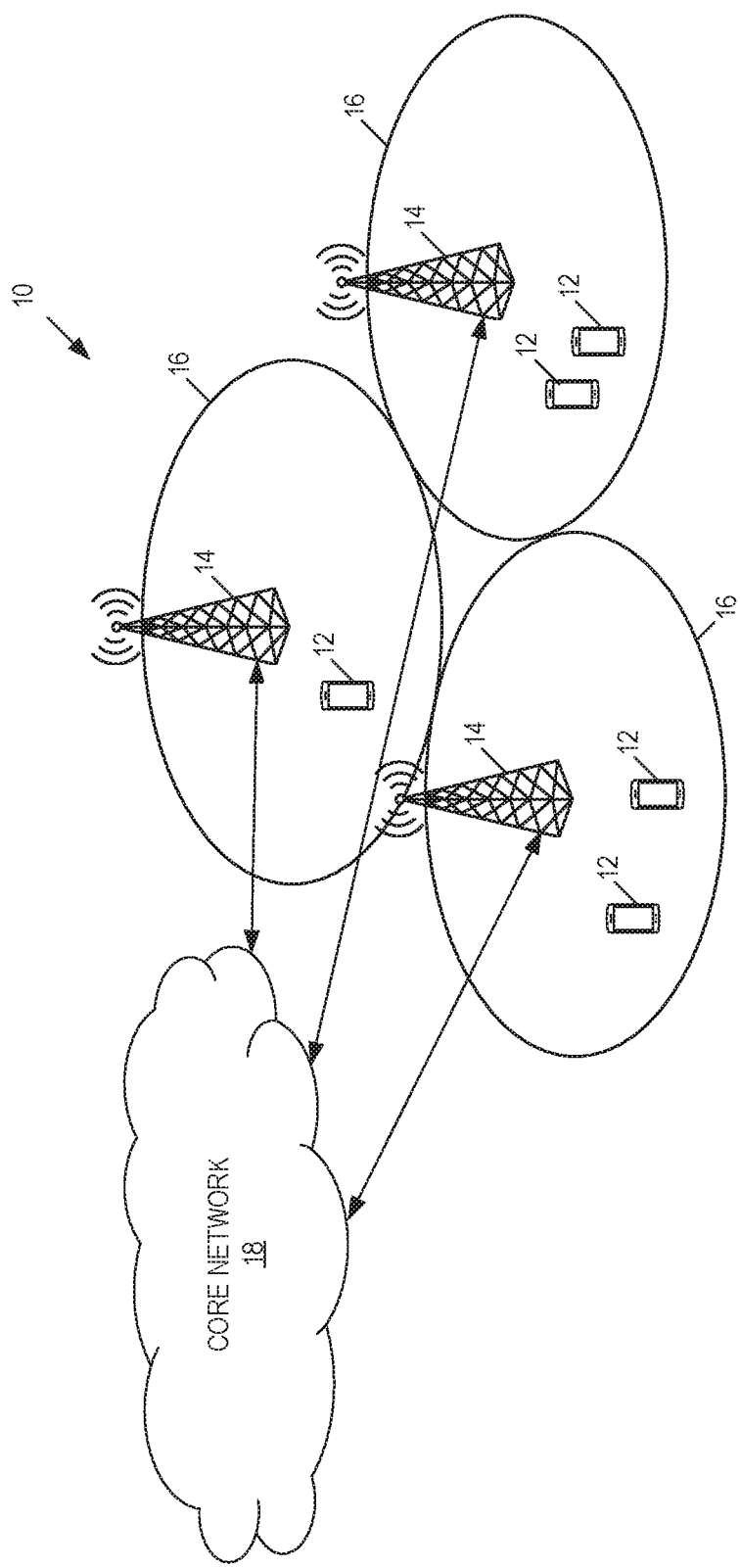
FIG. 3 illustrates a Long Term Evolution (LTE) network in which embodiments of the present disclosure are implemented according to some embodiments of the present disclosure.

The described embodiments may be implemented in any appropriate type of communication system supporting any suitable communication standards and using any suitable components. As one example, certain embodiments may be implemented in a LTE network, such as that illustrated in FIG. 3. As illustrated in FIG. 3, a communication network 10 (which again for this example is an LTE network) comprises a plurality of wireless communication devices 12 (e.g., conventional UEs, MTC/Machine-to-Machine (M2M) UEs) and a plurality of radio access nodes 14 (e.g., eNBs or other base stations). The communication network 10 is organized into cells 16, which are connected to a CN 18 via the corresponding radio access nodes 14. The radio access nodes 14 are capable of communicating with the wireless communication devices 12 along with any additional elements suitable to support communication between the wireless communication devices 12 or between a wireless communication device 12 and another communication device (such as a landline telephone).

Figure 4:
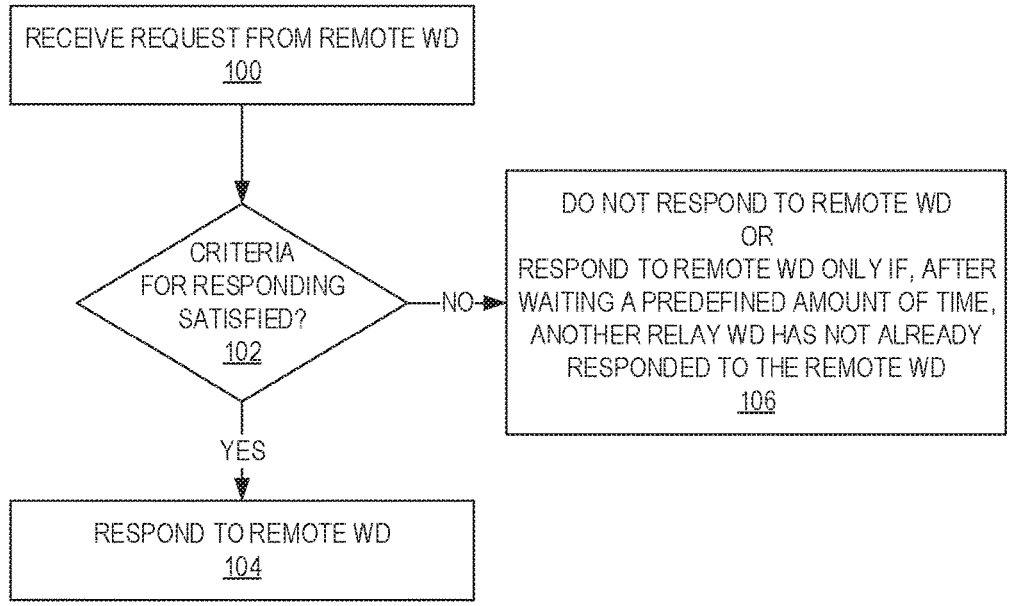
FIG. 4 illustrates the operation of a relay wireless device to limit responding to relay requests from remote wireless devices according to some embodiments of the present disclosure.

FIG. 4 is a flow chart that illustrates the operation of a relay wireless communication device 12 (referred to herein as a relay WD 12) according to some embodiments of the present disclosure. In general, this process corresponds to the solution to problem (1) described above. As illustrated, the relay WD 12 receives a relay request from a remote wireless communication device 12 (referred to herein as a remote WD 12) (step 100). In this example, the remote WD 12 is Out-of-Coverage (OOO) (i.e., is not within the coverage of any of the cells 16 of the communication network 10. Rather than simply responding to the remote WD 12 as would conventionally be done, the relay WD 12 first determines whether one or more criteria for responding to the relay request are satisfied (step 102). As discussed above, the one or more criteria may include, for example:

a criterion that the channel quality on PC5 (i.e., a radio channel between the relay WD 12 and the remote WD 12) is above a certain threshold, or a criterion that there is some type of prioritization flag in message 3 (i.e., the relay request) indicating, e.g., imminent peril or an emergency, or a criterion that message 3 (i.e., the relay request) is sent on resources reserved for prioritization, e.g. imminent peril or an emergency.

In some embodiments, the relay WD 12 responds to the remote WD 12 if any one or more of the example criteria above are satisfied. The relay WD 12 can also wait before replying to the remote WD 12 based on channel quality, thereby letting another relay WD 12 with better channel quality reply first.

If the one or more criteria are satisfied, then the relay WD 12 responds to the remote WD 12 (step 104). This response may include, for example, an indication of one or more services provided by the relay WD 12 and a ProSe UE ID of the relay WD 12 (which is a layer 2 identifier of the WD 12). Conversely, if the one or more criteria are not satisfied, then the relay WD 12 does not respond (i.e., refrains from responding) to the remote WD 12 (step 106). Alternatively, in some embodiments, the relay WD 12 will respond if, after waiting a predefined amount of time, another relay WD 12 has not already responded to the remote WD 12. Note that, in some embodiments, the relay WD 12 can determine whether another relay WD 12 has responded by monitoring for responses from other relay WDs 12. In this manner, fewer messages, in the form of responses from relay WDs 12, are sent to the remote WD 12 in response to the relay request, thereby limiting interference, reducing transmission overhead related to relay discovery, and improving the overall system performance.

Figure 5:
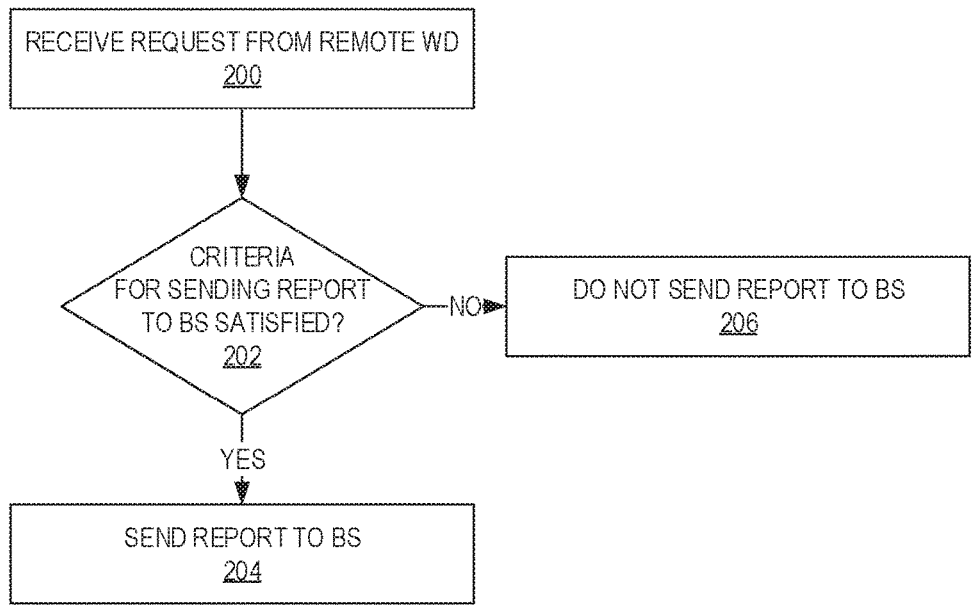
FIG. 5 illustrates the operation of a relay wireless device to report a remote wireless device to the network according to some embodiments of the present disclosure.

FIG. 5 is a flow chart that illustrates the operation of a relay WD 12 according to some embodiments of the present disclosure. In general, this process corresponds to the solution to problem (2) described above. As illustrated, the relay WD 12 receives a relay request from a remote WD 12 (step 200). In this example, the remote WD 12 is In-Coverage (InC) (i.e., is within the coverage of at least one of the cells 16 of the communication network 10). Rather than simply reporting the remote WD 12 to the the network (e.g., to the radio access node 14) as would conventionally be done, the relay WD 12 first determines whether one or more criteria for reporting the remote WD 12 to the network are satisfied (step 202). As discussed above, the one or more criteria may include, for example:

a criterion that the channel quality on PC5 (i.e., the radio channel between the remote WD 12 and the relay WD 12) is above a certain threshold, or a criterion that the channel quality of Uu (i.e., the radio channel between the remote WD 12 and the radio access node 14) is above a certain threshold, or a criterion that there is some type of prioritization flag in message 3 (i.e., the relay request) indicating, e.g., imminent peril or an emergency, or a criterion that message 3 is sent on resources reserved for prioritization, e.g. imminent peril or an emergency.

In some embodiments, the relay WD 12 reports the remote WD 12 to the communication network 10 if any one or more of the example criteria above are satisfied.

If the one or more criteria are satisfied, then the relay WD 12 reports the remote WD 12 to a network node (e.g., the radio access node 14) (step 204). This report may include, for example, a measurement of the PC5 radio channel quality and an identifier of the remote WD 12. Conversely, if the one or more criteria are not satisfied, then the relay WD 12 does not report (i.e., refrains from reporting) the remote WD 12 to the network node (e.g., the radio access node 14) (step 206). In this manner, fewer messages, in the form of reports from relay WDs 12, are sent to the network node(s) in response to relay requests from remote WDs 12, thereby limiting interference, reducing transmission overhead related to relay discovery, and improving the overall system performance.

Figure 6:
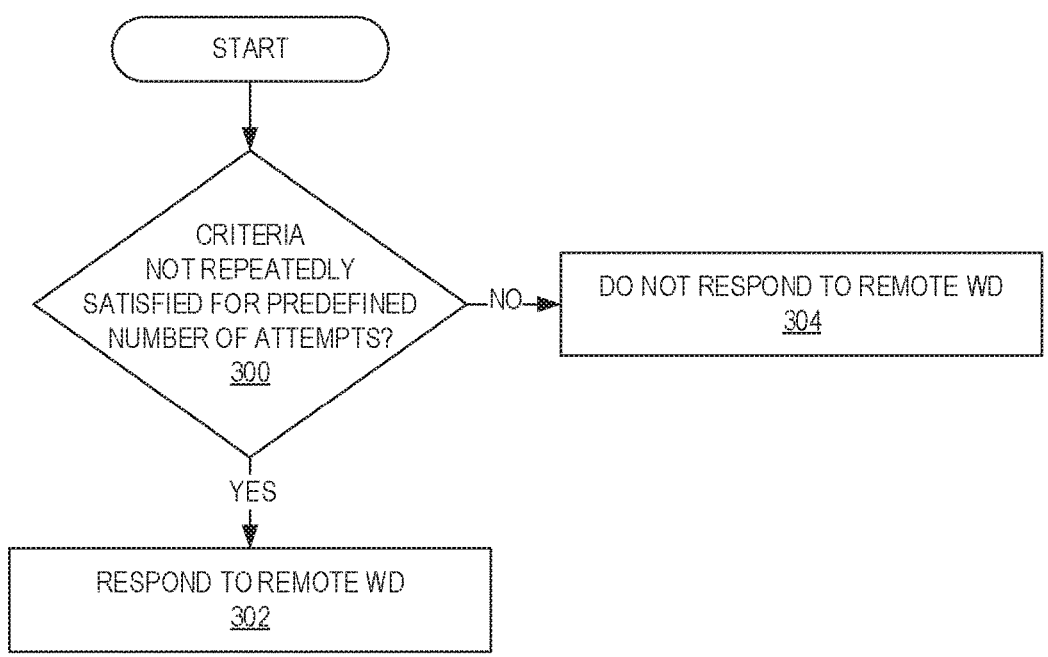
FIG. 6 is a flow chart that illustrates the operation of a relay wireless device to respond to a relay request from a remote wireless device upon repeatedly receiving relay requests from the same remote wireless device or remote UE even if criteria for responding to the relay requests are not satisfied.

As discussed above, for both problems (1) and (2) (e.g., for both the processes of FIG. 4 and FIG. 5), when the required criteria on link qualities/measurements or other status-related reports are not repeatedly fulfilled for a predefined number of attempts, the relay WD 12 can finally reply to the remote WD 12 declaring its availability. This is done to ensure that the remote WD 12 does not remain unserved after a maximum number of attempts for relay selection. In this regard, FIG. 6 is a flow chart that illustrates the operation of the relay WD 12 according to some embodiments of the present disclosure. In some embodiments, this process is performed as, or as part of, step 106 of FIG. 4. As illustrated, upon receiving a relay request from a remote WD 12 (and determining that the criteria for responding to the remote WD 12 are not satisfied per step 102 of FIG. 4), the relay WD 12 determines whether the criteria for responding to the remote WD 12 have not been satisfied repeatedly for a predefined maximum number of attempts/relay requests (step 300). If so, the relay WD 12 responds to the remote WD 12 even though the criteria are not satisfied (step 302).

Otherwise, the relay WD 12 does not respond (i.e., refrains from responding) to the relay request from the remote WD 12 (step 304).

Figure 7:
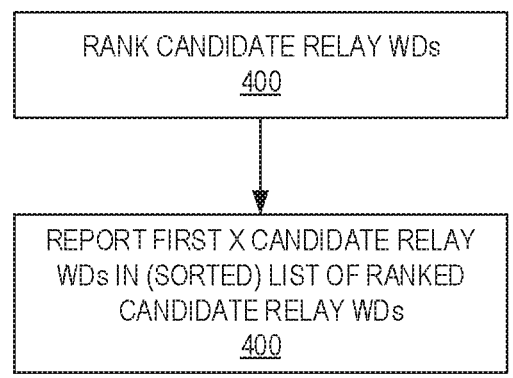
FIG. 7 illustrates the operation of a remote wireless device to report only some candidate relay wireless devices according to some embodiments of the present disclosure.

FIG. 7 is a flow chart that illustrates the operation of a remote WD 12 according to some embodiments of the present disclosure. In general, this process corresponds to the solution to problem (3) described above. Here, the remote WD 12 is InC of one or more of the cells 16 in the communication network 10. As illustrated, the remote WD 12 ranks multiple candidate relay WDs 12 based on, e.g., one or more predefined ranking rules (step 400). The predefined ranking rule(s) may be configured by, e.g., a network node (i.e., a node in the communication network 10 such as, e.g., a radio access node 14 or a core network node (i.e., a node in the CN 18)). As used herein, a candidate relay WD 12 is a WD 12 that has been discovered by the remote WD 12 in response to a relay request (i.e., WDs 12 that have responded to a relay request from the remote WD 12) but has not yet been selected as a relay by the remote WD 12. Rather than reporting all candidate relay WDs 12 to a network node (e.g., a radio access node 14), the remote WD 12 reports a subset of the candidate relay WDs 12, where, in this example, the subset is the first "x" candidate relay WDs 12 in the (sorted) ranked list of candidate relay WDs 12 (step 402). Here, "x" is a predefined number that may, in some embodiments, be configured by a network node (e.g., the radio access node 14).

Figure 8:
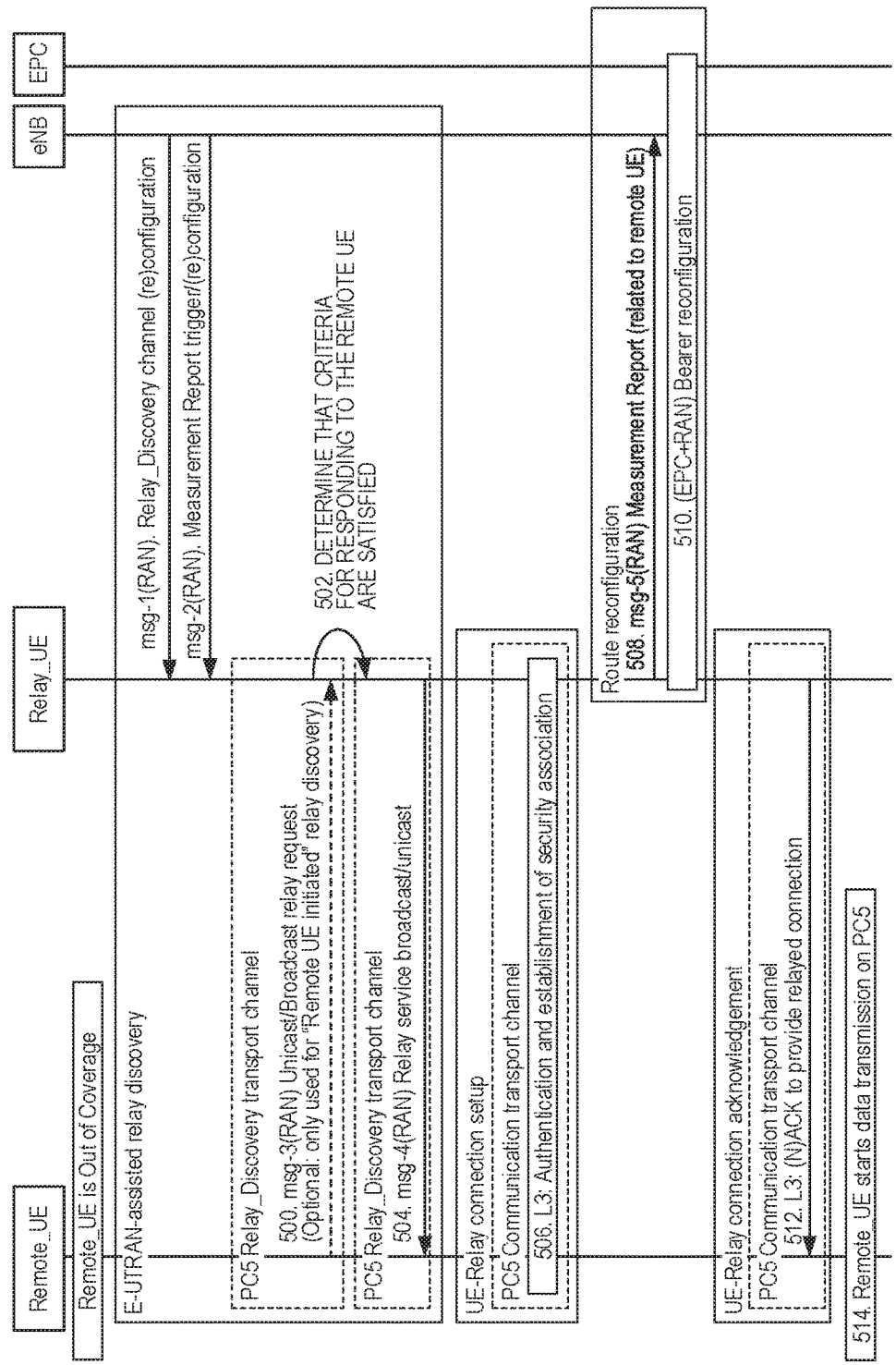
FIG. 8 illustrates a first scenario where an Out-of-Coverage (OoC) remote UE ("Remote_UE") may perform various measurements on a relay UE and report them in msg-3 according to some embodiments of the present disclosure.

The following description of FIGS. 8 and 9 presents two example signaling scenarios for relay selection, where a selected relay is chosen also based on measurements and their reports. The described framework may be applied to other generalized multi-hop scenarios where one node reports measurements related to the link to a certain other node to some other node.

Referring to FIG. 8, in a first scenario, an OOO remote WD 12 (referred to here as "Remote_UE") performs various measurements on the relay WD 12 (referred to here as "Relay_UE") and report them in a message referred to here as msg-3. Msg-3 is also referred to herein as a relay request. The Relay_UE may perform various measurements on the Remote_UE and report them in a message referred to here as msg-5, possibly along with other reports that can be useful for relay selection. The actual selection of the relay may be performed at the Remote_UE or at the radio access node 14 (eNB in this example). Note that the messages in FIG. 8 may also occur in different sequential order.

More specifically, as illustrated in FIG. 8, an enhanced or evolved Universal Terrestrial Radio Access Network (E-UTRAN)-assisted relay discovery procedure is performed. During the E-UTRAN-assisted relay discovery procedure, Remote_UE sends msg-3 (a unicast/broadcast relay request) (step 500). Msg-3 is sent via a PC5 communication channel (which may also be referred to herein as a PC5 relay discovery transport channel). For instance, the PC5 communication channel may be a Sidelink Discovery Channel (SL-DCH). According to some embodiments of the present disclosure, the Relay_UE determines whether one or more criteria for responding to the Remote_UE are satisfied (step 502). If the one or more criteria are satisfied (or, in some embodiments, if a predetermined amount of time has passed without another Relay_UE responding to the relay request), the Relay_UE sends a msg-4 (relay service broadcast/unicast) (step 504). Msg-4 is sent via the PC5 relay discovery transport channel.

Next, a UE-relay connection setup procedure is performed. For this procedure, the Remote_UE and the Relay_UE communicate to perform layer 3 (L3) authentication and establishment of security association (step 506). In addition, a route configuration procedure is performed. For the route configuration procedure, the Relay_UE sends a msg-5 (measurement reported related to the Remote_UE) to the eNB (step 508). The Relay_UE, the eNB, and the CN 18 (which in this example is an Evolved Packet Core (EPC) network) communicate to perform bearer reconfiguration (step 510).

A relay-UE connection acknowledgment procedure is then performed. In this procedure, the Relay_UE sends a L3 Acknowledgment (ACK) to the Remote_UE to provide the relay connection (step 512). The Remote_UE then starts data transmission on PC5 (step 514), where this data transmission is relayed to the eNB via the Relay_UE.

Figure 9A:
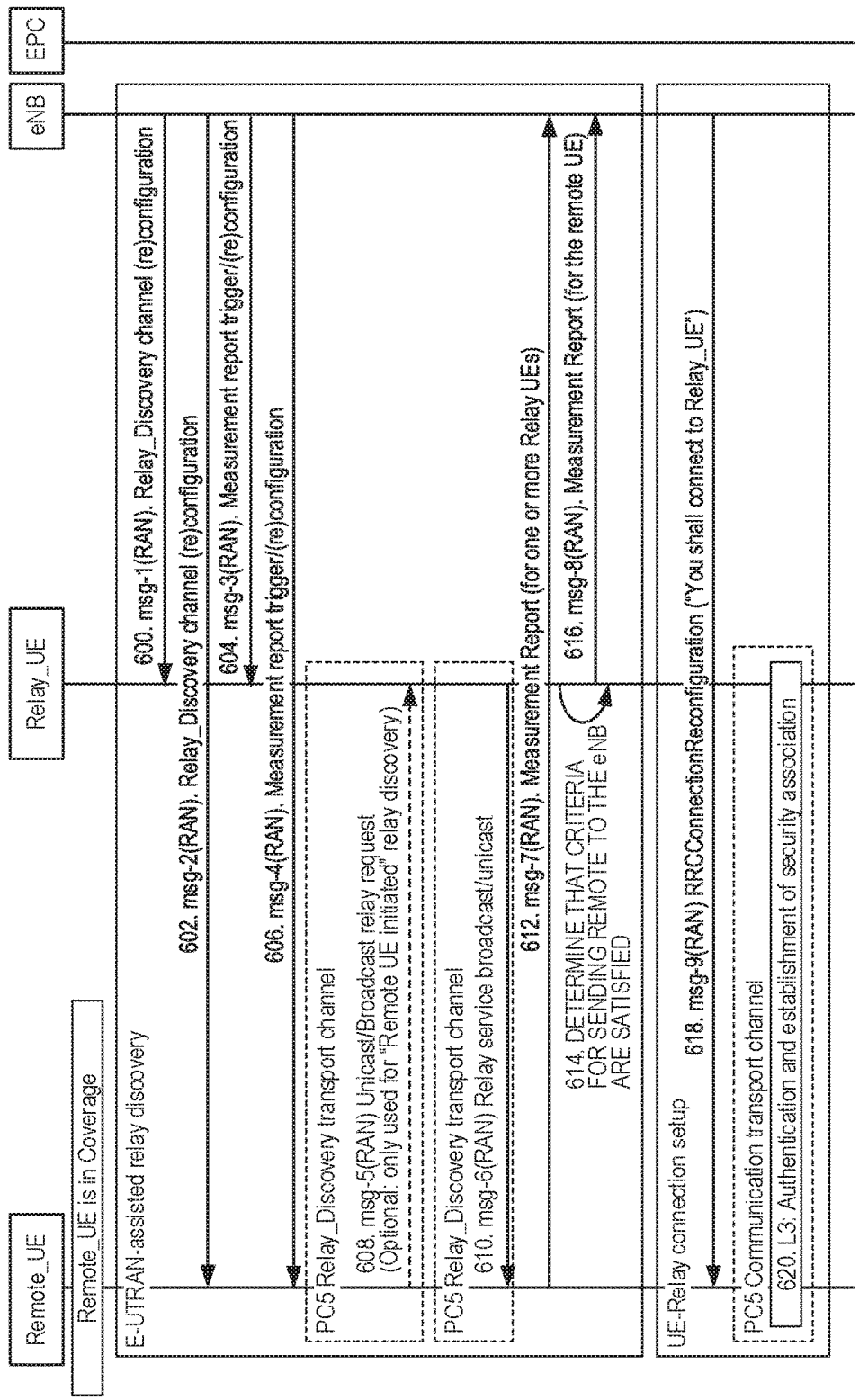
FIGS. 9A and 9B illustrate a second scenario where an In-Coverage (InC) remote UE may perform various measurements on the relay UE and report them in msg-5 to the relay UE or in msg-7 to the network according to some embodiments of the present disclosure.
Figure 9B:
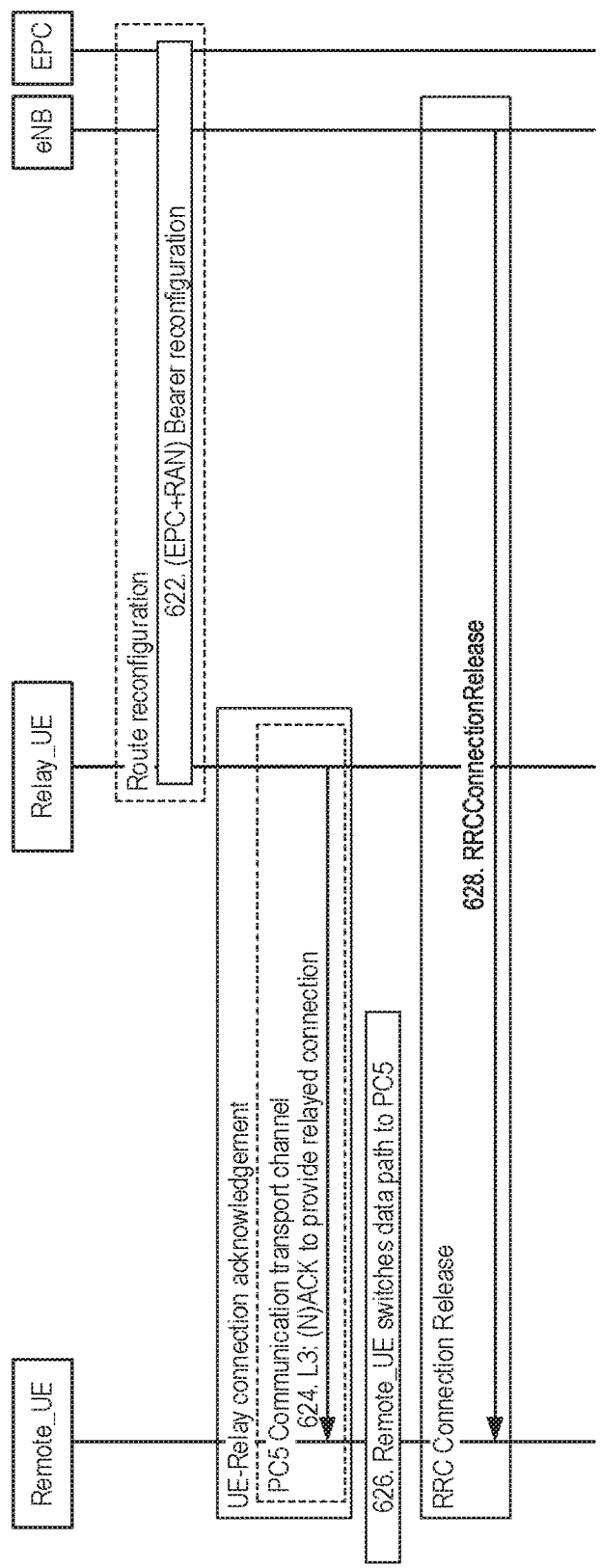

Referring to FIGS. 9A and 9B, in a second scenario an InC remote WD 12 (referred to as "Remote_UE") may perform various measurements on the relay WD 12 (referred to as "Relay_UE") and report them in msg-5 to the Relay_UE or in msg-7 to the radio access node 14 (eNB in this example). The Relay_UE may perform various measurements on the Remote_UE and report them in msg-8, possibly along with other reports that can be useful for relay selection. The actual selection of the relay may be performed at the remote UE or at the eNB. The messages in FIGS. 9A and 9B may also occur in different sequential order.

More specifically, as illustrated in FIG. 9A, a E-UTRAN-assisted relay discovery procedure is performed. During the E-UTRAN-assisted relay discovery procedure, the eNB sends msg-1 (relay discovery channel (re)configuration) to the Relay_UE (step 600) and msg-2 (relay discovery channel (re)configuration) to the Remote_UE (step 602). The eNB also sends msg-3 (measurement report trigger/(re)configuration) to the Relay_UE (step 604) and msg-4 (measurement report trigger/(re)configuration) to the Remote_UE (step 606).

The Remote_UE sends msg-5 (unicast/broadcast relay request) to the Relay-UE (step 608). Msg-5 is sent via a PC5 communication channel. The Relay_UE sends a msg-6 (relay service broadcast/unicast) to the Remote_UE (step 610). Msg-6 is sent via the PC5 relay discovery transport channel. While not illustrated, according to some embodiments of the present disclosure, the Relay_UE may determine whether one or more criteria for responding to the Remote_UE are satisfied and respond to the Remote_UE with msg-6 if (e.g., only if) the one or more criteria are satisfied (or in some embodiments if a predetermined amount of time has expired without another Relay_UE responding to the relay request).

Since the Remote_UE is in coverage, the Remote_UE sends a msg-7 (measurement report for one or more Relay_UEs) to the eNB (step 612). While not illustrated, in some embodiments, the solution for problem (3) (e.g., the process of FIG. 7) may be utilized at the Remote_UE to limit the candidate Relay_UEs for which the Remote_UE includes measurements in the measurement report of msg-7.

In this embodiment, the Relay_UE determines whether one or more criteria for reporting the Remote_UE to the eNB are satisfied (e.g., according to the process of FIG. 5) (step 614). If the one or more criteria are satisfied, the Relay_UE sends msg-8 (measurement report for the Remote_UE) to the eNB (step 616). This measurement report includes, e.g., a measurement of the radio channel quality of PC5 (i.e., the radio channel between the Remote_UE and the Relay_UE).

Next, a UE-relay connection setup procedure is performed. For this procedure, the eNB sends msg-9 to the Remote_UE, where msg-9 instructs the Remote_UE to connect to the Relay_UE (step 618). The Remote_UE and the Relay_UE communicate to perform L3 authentication and establishment of security association (step 620). In addition, a route configuration procedure is performed. For the route configuration procedure, the Relay_UE, the eNB, and the CN 18 (which in this example is an EPC network) communicate to perform bearer reconfiguration (step 622).

A relay-UE connection acknowledgment procedure is then performed. In this procedure, the Relay_UE sends a L3 ACK to the Remote_UE to provide the relay connection (step 624). The Remote_UE then starts data transmission on PC5 (step 626), where this data transmission is relayed to the eNB via the Relay_UE. The connection between the Remote_UE and the eNB is released (step 628).

The following description of FIGS. 10 through 14 presents various methods that can be implemented in a wireless communication device 12, according to various embodiments of the present disclosure. In the description of FIGS. 10 through 14, the wireless communication device 12 will be referred to as a "Relay UE" or "relay WD" which reflects the "ProSe UE to NW relay" node defined in 3GPP Release 13 (Rel-13).

Figure 10:
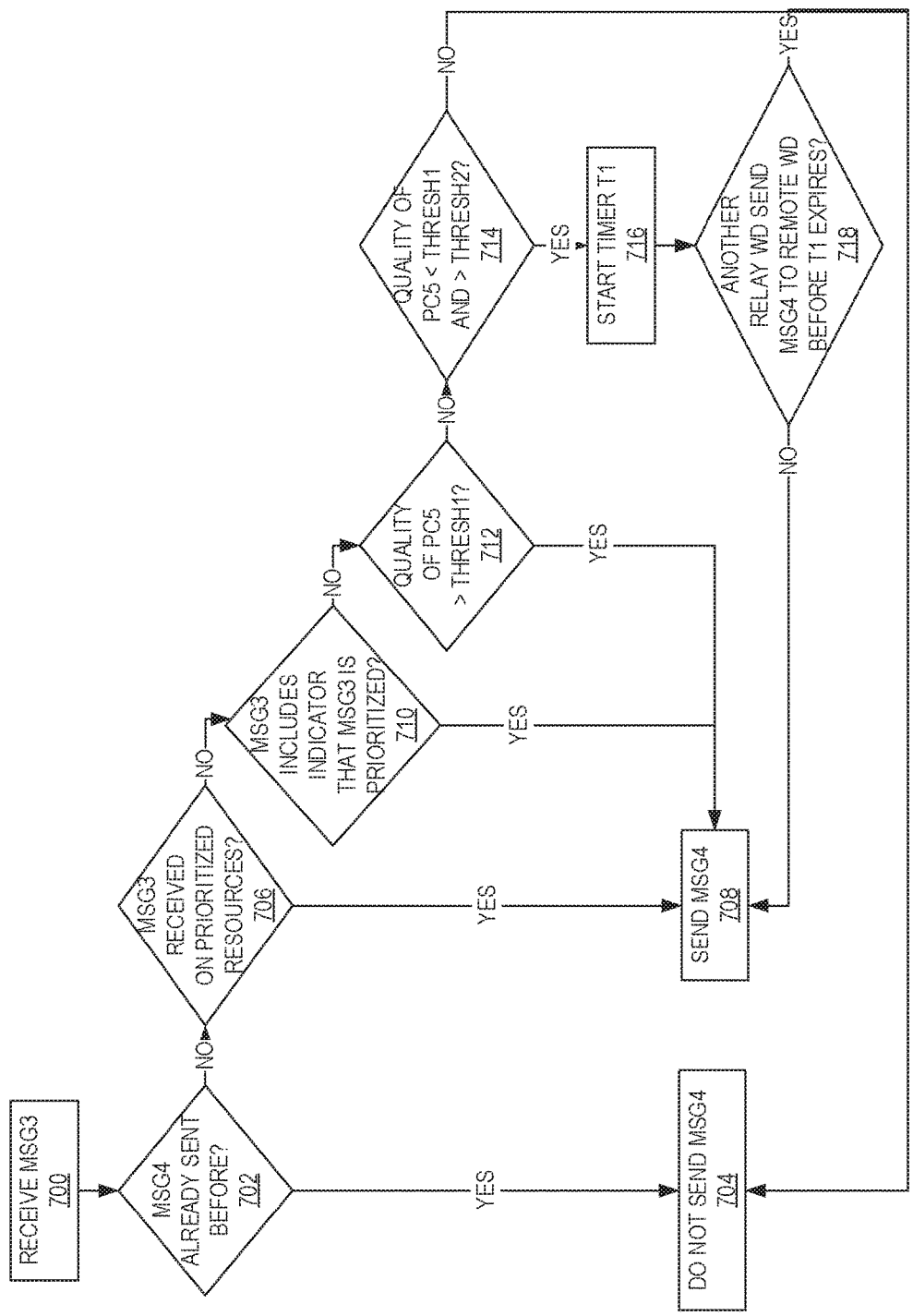
FIG. 10 illustrates a first method, which provides a way to limit the number of relay UEs responding to a relay request from the same remote UE according to some embodiments of the present disclosure.

FIG. 10 illustrates a first method, which addresses problem (1) and provides a way to limit the number of Relay UEs sending msg-4 ("Relay Service") in the framework of FIG. 8 according to some embodiments of the present disclosure. Referring to FIG. 10, when the Relay UE receives msg-3 ("Relay Request") from a Remote UE (step 700), the Relay UE needs to decide whether or not to transmit msg-4. If the Relay UE has already sent msg-4 (step 702; YES), then the Relay UE does not transmit msg-4 (step 704). Otherwise (step 702; NO), if msg-3 is received on resources in the time-frequency plane which are somehow prioritized (e.g., they can only be used for calls of emergency and imminent peril) (step 706; YES), then the Relay UE transmits msg-4 (step 708).

Otherwise (step 706; NO), if msg-3 contains a flag or some other information that shows that this message is prioritized (e.g., it is a call relating to an emergency or imminent peril) (step 710; YES), then the Relay UE transmits msg-4 (step 708). Otherwise (step 710; NO), if the radio channel quality of the Remote UE to Relay UE radio channel (PC5) is greater than some threshold value thresh1 (step 712; YES), then the Relay UE transmits msg-4 (step 708). Otherwise (step 712; NO), if the radio channel quality of the Remote UE to Relay UE radio channel (PC5) is less than some threshold value thresh1 but greater than some threshold value thresh2 (step 714; YES), then the Relay UE starts timer T1 (step 716). If another Relay UE does not transmit msg-4 to the Remote UE before timer T1 expires (step 718, NO), then the Relay UE transmits msg-4 (step 708). Otherwise (step 718; YES or step 714; NO), the Relay UE does not transmit (i.e., refrains from transmitting) msg-4 (step 704).

Importantly, while FIG. 10 illustrates the use of many criteria, in some implementations not all of the criteria of FIG. 10 may be used or some additional or alternative criteria may be used. Further, while the process of FIG. 10 considers the criteria in a specific order, the criteria (particularly, but not limited to, those of steps 706, 710, and 712) may be considered in any desired order.

Figure 11A:
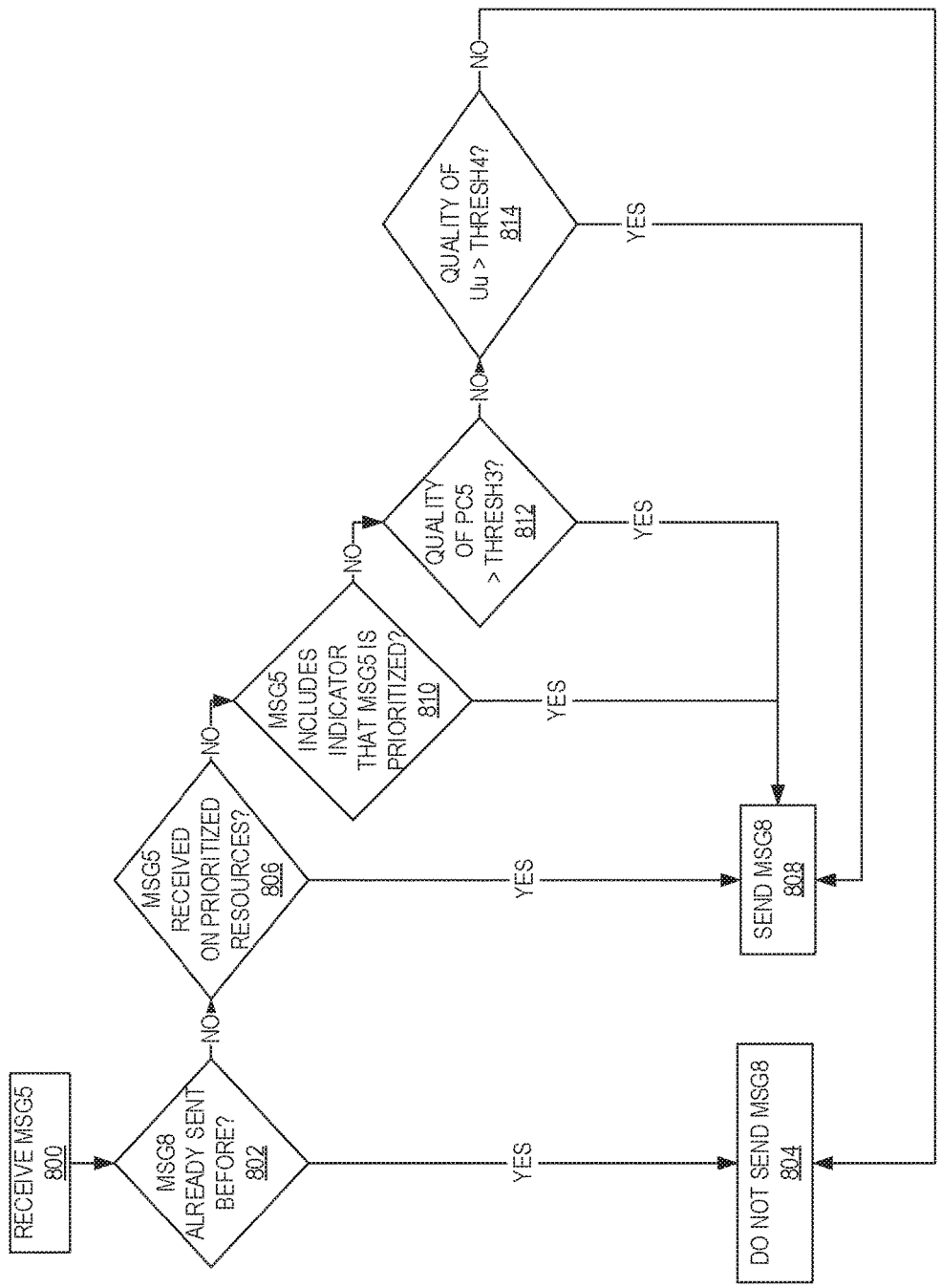
FIGS. 11A and 11B illustrate two embodiments of a second method that each provides a way to limit the number of relay UEs reporting a remote UE to the network according to some embodiments of the present disclosure.
Figure 11B:
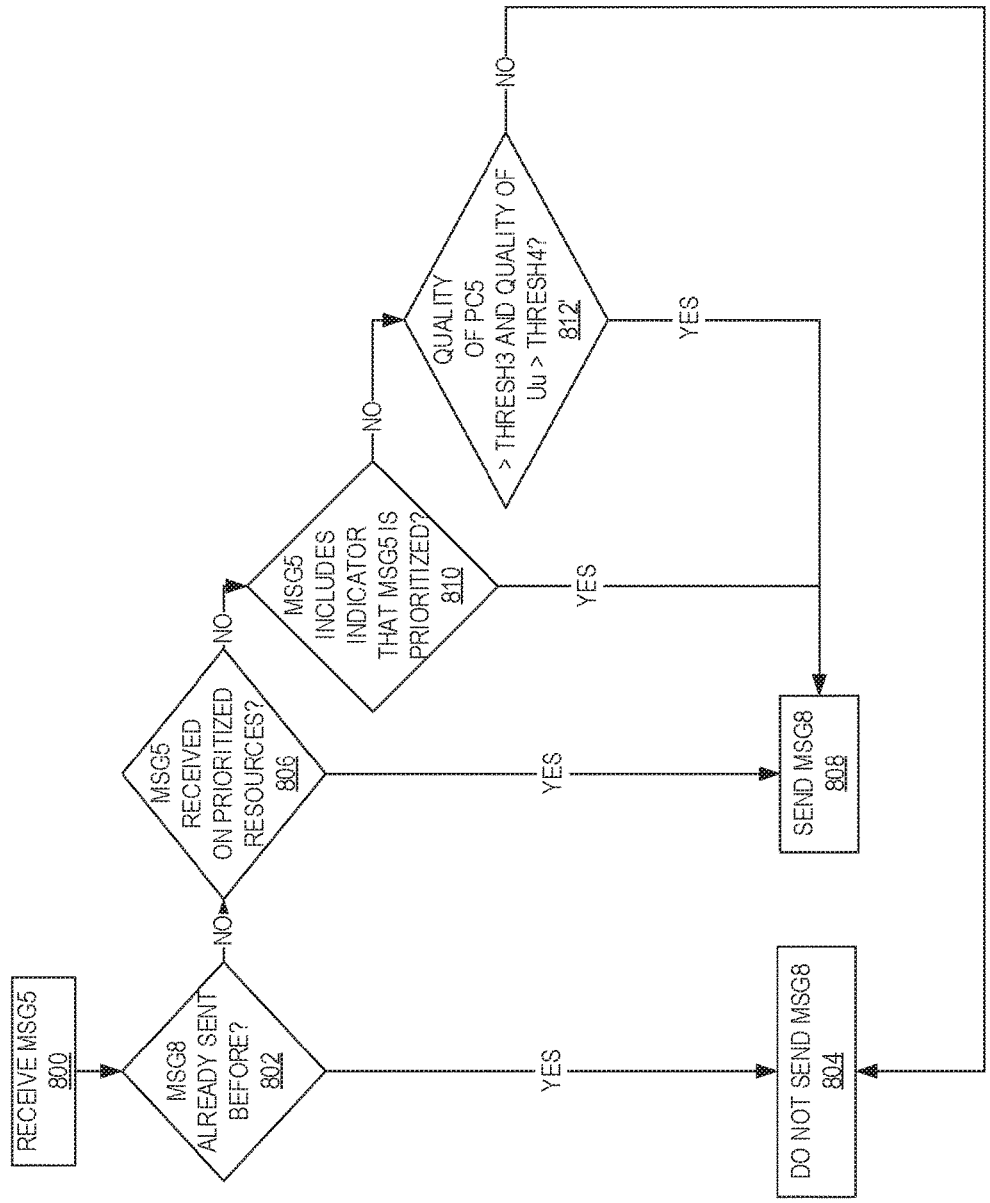

FIGS. 11A and 11B illustrate embodiments of a second method, which addresses problem (2) and provides a way to limit the number of Relay UEs sending msg-8 ("Measurement Report") to the network. Referring first to FIG. 11A, when the Relay UE receives msg-5 ("Relay Request") from the Remote UE (step 800), the Relay UE decides whether or not to transmit msg-8. As illustrated, if the Relay UE has already sent msg-8 (step 802; YES), then the Relay UE does not transmit (i.e., refrains from sending) msg-8 (step 804). Otherwise (step 802; NO), if msg-5 is sent on resources in the time-frequency plane which are somehow prioritized (e.g., they can only be used for calls of emergency and imminent peril) (step 806; YES), then the Relay UE transmits msg-8 to the network (e.g., to the eNB) (step 808).

Otherwise (step 806; NO), if msg-5 contains a flag or some other information that shows that this message is prioritized (e.g., it is a call relating to an emergency or imminent peril) (step 810; YES), then the Relay UE transmits msg-8 to the network (e.g., to the eNB) (step 808). Otherwise (step 810; NO), if the radio channel quality of the Remote UE to Relay UE radio channel (PC5) is greater than some threshold value thresh3 (step 812; YES), then the Relay UE transmits msg-8 to the network (e.g., to the eNB) (step 808). Otherwise (step 812; NO), if the radio channel quality of the Relay UE to the eNB radio channel (Uu) is greater than some threshold value thresh4 (step 814; YES), then the Relay UE transmits msg-8 to the network (e.g., to the eNB) (step 808). Otherwise (step 814; NO), the Relay UE does not transmit (i.e., refrains from transmitting) msg-8 (step 804).

Importantly, while FIG. 11A illustrates the use of many criteria, in some implementations, not all of the criteria of FIG. 11A may be used or some additional or alternative criteria may be used. Further, while the process of FIG. 11A considers the criteria in a specific order, the criteria (particularly, but not limited to, those of steps 806, 810, 812, and 814) may be considered in any desired order.

It is possible to envision a combination of the two requirements on channel quality in steps 812 and 814, e.g. only one channel needs to be ok, or that both need to be above the threshold. In this regard, FIG. 11B illustrates an embodiment that is similar to that of FIG. 11A but where the criteria of steps 812 and 814 are combined into a single criterion considered in step 812'. As illustrated, when the Relay UE receives msg-5 ("Relay Request") from the Remote UE (step 800), the Relay UE decides whether or not to transmit msg-8. As illustrated, if the Relay UE has already sent msg-8 (step 802; YES), then the Relay UE does not transmit (i.e., refrains from sending) msg-8 (step 804). Otherwise (step 802; NO), if msg-5 is sent on resources in the time-frequency plane which are somehow prioritized (e.g., they can only be used for calls of emergency and imminent peril) (step 806; YES), then the Relay UE transmits msg-8 to the network (e.g., to the eNB) (step 808).

Otherwise (step 806; NO), if msg-5 contains a flag or some other information that shows that this message is prioritized (e.g., it is a call relating to an emergency or imminent peril) (step 810; YES), then the Relay UE transmits msg-8 to the network (e.g., to the eNB) (step 808). Otherwise (step 810; NO), if the radio channel quality of the Remote UE to Relay UE radio channel (PC5) is greater than some threshold value thresh3 and if the radio channel quality of the Relay UE to eNB radio channel (Uu) is greater than some threshold value thresh4 (step 812'; YES), then the Relay UE transmits msg-8 to the network (e.g., to the eNB) (step 808). Otherwise (step 812'; NO), the Relay UE does not transmit (i.e., refrains from transmitting) msg-8 (step 804).

Importantly, while FIG. 11B illustrates the use of many criteria, in some implementations, not all of the criteria of FIG. 11B may be used or some additional or alternative criteria may be used. Further, while the process of FIG. 11B considers the criteria in a specific order, the criteria (particularly, but not limited to, those of steps 806, 810, and 812') may be considered in any desired order.

Figure 12:
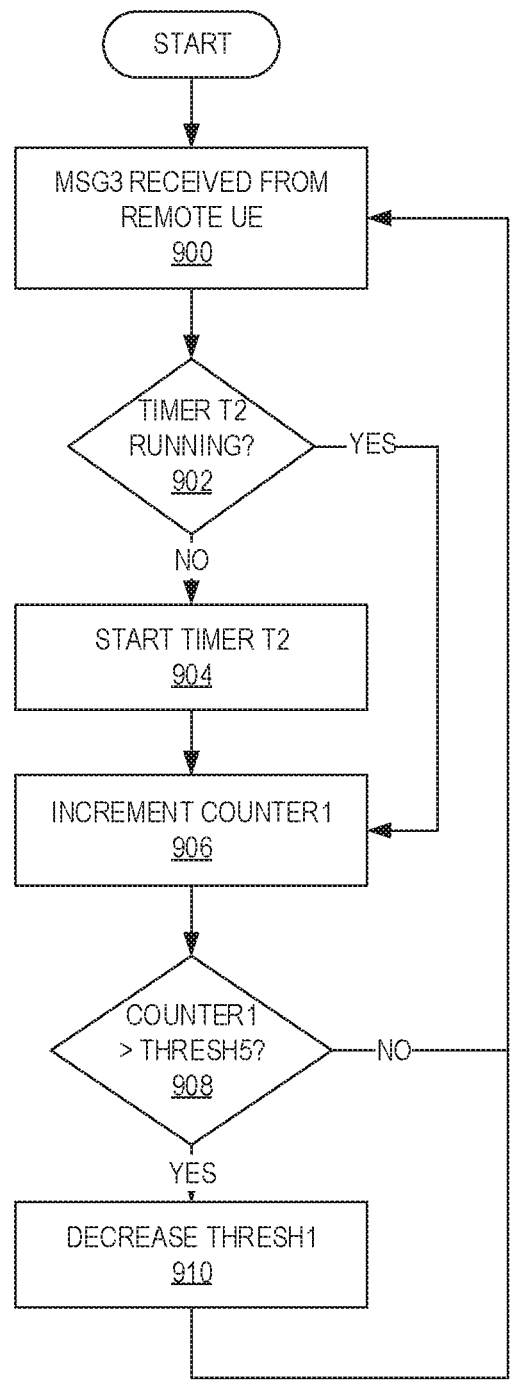
FIGS. 12 and 13 illustrate a third method that provides a way to decrease thresh1 of FIG. 10 to thereby increase the probability of the relay UE responding to the relay request from a remote UE when multiple receptions of a relay request are received by the relay UE from the same remote UE according to some embodiments of the present disclosure.

In the process of FIG. 10, the threshold thresh1 is used to determine whether to transmit msg-4. This means that if thresh1 is decreased, the likelihood of the Relay UE transmitting msg-4 increases. FIG. 12 is a flow chart that illustrates the operation of the Relay UE to decrease thresh1 in order to increase the likelihood of the Relay UE transmitting msg-4 according to some embodiments of the present disclosure. This process is particularly well-suited for a scenario in which the Remote UE re-transmits msg-3 until a Relay UE replies. In other words, FIG. 12 illustrates a process, which applies to problem (1), that provides a way to decrease thresh1 to increase the probability for transmission of msg-4 when subsequent receptions of msg-3 from the same Remote UE occur.

Figure 13:
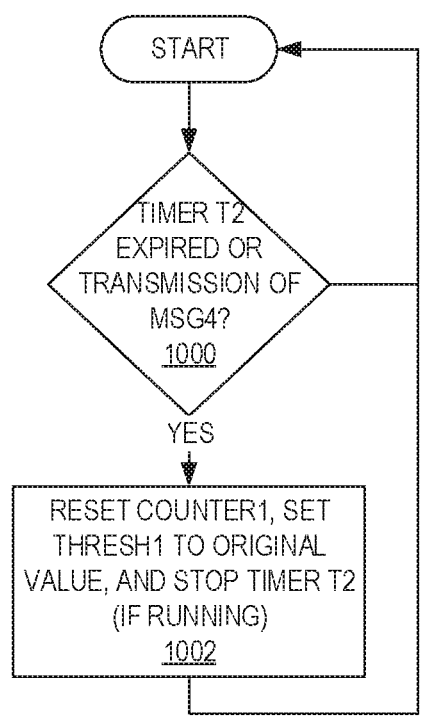

Referring to FIG. 12, upon receiving msg-3 from the Remote UE (step 900), timer T2 is started (step 904), if not already running (step 902; NO). Then, whether proceeding from step 902 or step 904, the Relay UE increments a counter, counter1, is incremented (step 906). Counter1 is a counter of the number of relay requests received from the same Remote UE within the duration of the timer T2. If counter1 is greater than some threshold thresh5 (step 908; YES), then the Remote UE decreases thresh1 (step 910). Note that, in some embodiments, counter1 is reset every time thresh1 is decreased. This decreased thresh1 is then used in the process of FIG. 10 when determining whether the Relay UE should respond to the next relay request received from the same Remote UE. At this point, the process returns to step 900 and is repeated upon receiving the next relay request from the same Remote UE. As illustrated in FIG. 13, upon expiry of timer T2 or transmission of msg-4 to the Remote UE (step 1000; YES), the Relay UE resets counter1 (e.g., rests counter1 to 0), sets thresh1 to its original value, and stops timer T2 (if still running) (step 1002). In the method of FIGS. 12 and 13, all threshold values, counter values, and timer values are configured by the network (e.g., eNB). Note that the purpose of the timer T2 is to ensure that the process of FIGS. 12 and 13 returns to its original state if the Remote UE stops transmitting msg-3, which should happen if another Relay UE replies or if the Remote UE is no longer interested in relaying.

Figure 14:
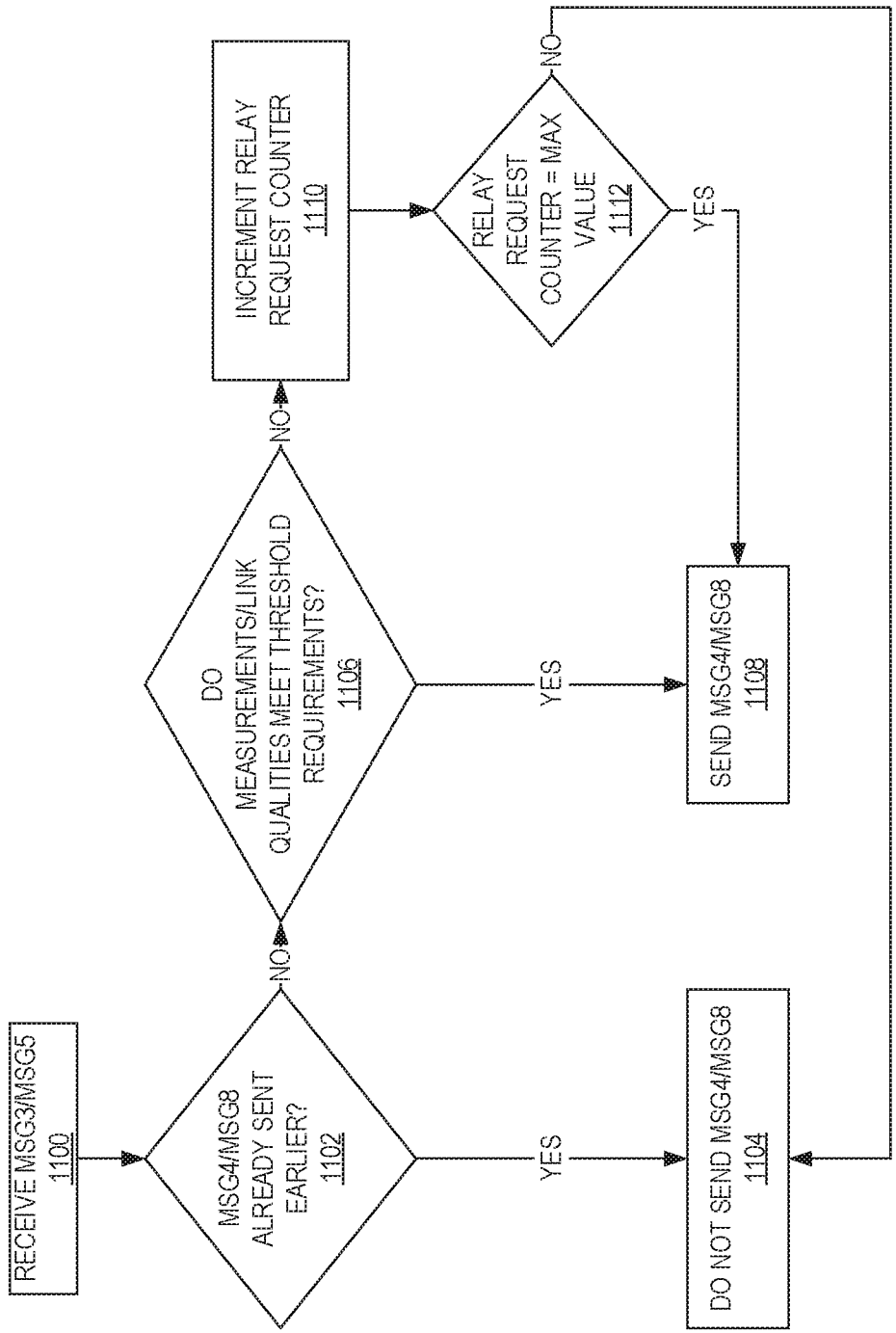
FIG. 14 illustrates a fourth method that provides a way to limit the number of relay UEs responding to a relay request from the same remote UE and/or a way to limit the number of relay UEs reporting a remote UE to the network according to some embodiments of the present disclosure.

FIG. 14 is a flow chart that illustrates the operation of the Relay UE according to some embodiments of the present disclosure. This process applies to both problems (1) and (2). Referring to FIG. 14 and as discussed in relation to the embodiments of FIGS. 10, 11A, and 11B, one or more radio measurements and/or link qualities have to be above certain thresholds in order to send msg-4 (problem 1) and msg-8 (problem 2). Assuming that the Relay UE has a counter, namely, a "Relay request counter" associated to the Remote UE, the value of the counter is increased by +1 if the relay UE receives a relay request from the remote UE and the relevant measurements or link qualities are below the (predefined) required thresholds. A maximum value is associated with this counter, where the maximum value can be, in some embodiments, configured by the network. If the value of "Relay request counter" reaches its Max value, the Relay UE sends msg-4 (problem 1) or msg-8 (problem 2) even if the required thresholds are not met. The value of the counter is set to zero whenever the relay sends msg-4 (Problem 1) or msg-8 (Problem 2).

This process is illustrated in FIG. 14. As illustrated, the Relay UE receives msg-3 (relay request, problem 1) or msg-5 (relay request, problem 2) (step 1100). If the Relay UE has already sent msg-4 (problem 1) or msg-8 (problem 2) (step 1102; YES), then the Relay UE does not send (i.e., refrains from sending) msg-4 (problem 1) or msg-8 (problem 2) (step 1104). Otherwise (step 1102; NO), the Relay UE determines whether one or more radio measurements and/or link qualities are above certain thresholds in order to send msg-4 (problem 1) or msg-8 (problem 2) (step 1106). If so, the Relay UE sends msg-4 (problem 1) or msg-8 (problem 2) (step 1108). Otherwise, the Relay UE increments the relay request counter (step 1110) and determines whether the relay request counter has reached its predefined maximum value (step 1112). If the relay request counter has not reached its maximum value, then the Relay UE does not send (i.e., refrains from sending) msg-4 (problem 1) or msg-8 (problem 2) (step 1104). However, if the relay request counter has reached its maximum value (step 1112; YES), the Relay UE sends msg-4 (problem 1) or msg-8 (problem 2) (step 1108).

Embodiments that address problem (3) are also disclosed. In some embodiments, a method is provided that addresses problem (3), which relates to content or size of msg-7 shown in the relay discovery signaling chart for the InC Remote UE illustrated in FIGS. 9A and 9B. In some embodiments, msg-7 (measurement report for one or more (candidate) Relay UEs) is sent from a Remote UE to the network (e.g., to the eNB). Msg-7 contains measurement and/or status related reports for the candidate Relay UEs. The question is how many and which Relay UEs should be reported.

For a given size of msg-7, one can trade-off between the number of Relay UEs reported and the amount of measurement and/or status related information to be reported for each Relay UE. A large number of reported Relay UEs will increase the options at the eNB, whereas as finer and more measurement/status reports may lead to a better selection from the given set of candidate Relay UEs. One approach to addressing this problem is presented below.

A Remote UE can receive some status and measurement related reports from the Relay UEs. The Remote UE can also perform measurements and assessment of Device-to-Device (D2D) links between the Remote UE and the Relay UEs based on the received signals from the Relay UEs. Based on this information, the Remote UE can rank the candidate Relay UEs under a rule and report the first x number of Relay UEs in the (ranked) list. Here, the rule is configurable by the network and the number x can also be set by the network. Moreover, the measurements that are used to rank the Relay UEs (under the ranking rule) may not be the same as the ones that are reported to the eNB in msg-7. For instance, a Remote UE can rank the Relay UEs using all given information (including measurements, reported measurements, status reports, and link quality assessments) but only report the measurements that the Remote UE has performed on the D2D link. The reported measurements are measurements of the radio channel quality of the link or radio channel between the Relay UEs and the Remote UE (e.g., the Relay UEs may broadcast these measurement values to the Remote UE, which can, e.g., select the Relay UE having the strongest/best radio channel). The status reports are status reports provided by the Relay UEs that include information such as, for example, power left at the Relay UEs, whether the Relay UEs are to be turned off, or any other information about the status of the Relay UEs. The status reports could, e.g., be broadcast by the Relay UEs. Link quality assessments may include, e.g., D2D link quality assessments for the links or radio channels between the Relay UEs and the Remote UE that the Remote UE performs itself, reported measurements (as discussed above), and/or radio quality of the link or radio channel between the Remote UE and the eNB.

As indicated by the foregoing, in certain embodiments of the disclosed subject matter, a ranking rule is configured by the network. This rule is potentially different from the rule that is used for relay selection by the Remote UE in the OoC scenario. Note that, here, a Relay UE is finally selected by the eNB (InC relay discovery scenario). The ranking rule potentially considers more parameters than the parameters that are reported to eNB. The number of Relay UEs to be reported is configurable by the network. These and other embodiments of the disclosed subject matter can potentially reduce the amount of signaling required to setup of a ProSe UE to network relay. This reduction can be accomplished, for instance, through the following features, which may apply to messages for both setup links, i.e., between the ProSe UE and the Relay UE as well as between the Relay UE and the eNB: (1) requirements for when a message is sent, (2) triggers for when a message is sent, (3) dynamic thresholds (related to number of transmissions), and (4) comparison of quality measures for different UE replies. A significant reason why this approach is beneficial is that the setup procedure involves a number of broadcasts within one group, rather than one to one communication that would be expected during a normal setup procedure.

Figure 15:
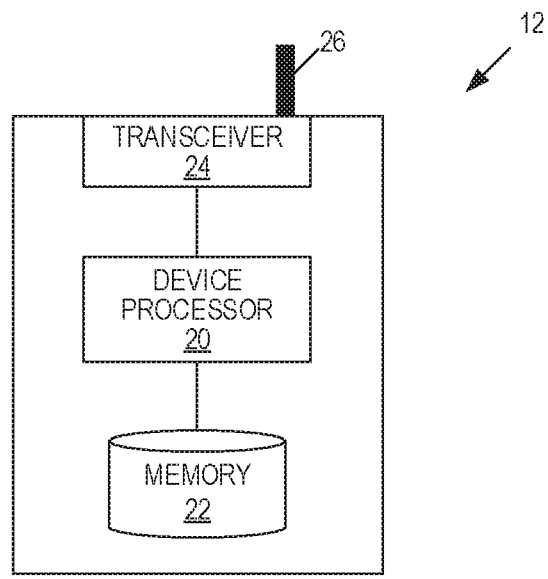
FIGS. 15 and 16 illustrate two example embodiments of a wireless communication device.
Figure 16:
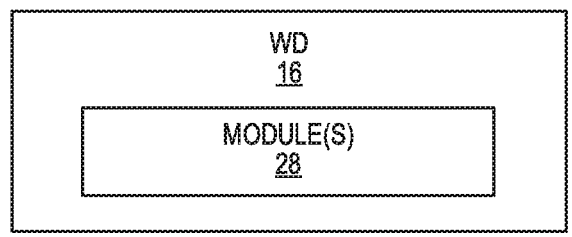

Although wireless communication devices 12 may represent communication devices that include any suitable combination of hardware and/or software, these wireless communication devices 12 may, in certain embodiments, represent devices such as an example wireless communication device 12 illustrated in greater detail by FIGS. 15 and 16. Similarly, although the illustrated radio access node 14 may represent network nodes that include any suitable combination of hardware and/or software, these nodes may, in particular embodiments, represent devices such as the example radio access node 14 illustrated in greater detail by FIGS. 17 and 18.

Referring to FIG. 15, a wireless communication device 12 comprises a processor 20 (e.g., one or more Central Processing Units (CPUs), one or more Application Specific Integrated Circuits (ASICs), one or more Field Programmable Gate Arrays (FPGAs), or the like, or any combination thereof), memory 22, a transceiver 24, and an antenna 26. In certain embodiments, some or all of the functionality described as being provided by UEs, MTC or M2M devices, and/or any other types of wireless communication devices may be provided by the processor 20 executing instructions stored on a computer-readable medium, such as the memory 22 shown in FIG. 15. Alternative embodiments may include additional components beyond those shown in FIG. 15 that may be responsible for providing certain aspects of the device's functionality, including any of the functionality described herein.

In some embodiments, a computer program including instructions which, when executed by at least one processor, causes the at least one processor to carry out the functionality of the wireless communication device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 22).

FIG. 16 illustrates a wireless communication device 12 according to some other embodiments of the present disclosure. As illustrated, the wireless communication device 12 includes one or more modules 28, each of which is implemented in software. For example, the module(s) 28 may include a relay request reception module that operates to receive (via an associated receiver of the wireless communication device 12, which is not shown) a relay request from a Remote UE, a decision module that operates to decide whether to respond to the Remote UE (problem 1) and/or whether to report the Remote UE to the network (problem 2), as described above. The module(s) 28 may also include a transmission module that operates to transmit a response to the Remote UE and/or to report the Remote UE to the network, as described above. In other embodiments, the wireless communication device 12 is a remote wireless device or Remote UE, and the module(s) 28 include a ranking module that operates to rank candidate relay wireless devices and a transmission module that operates to report a subset of the relay wireless devices based on their respective ranks, as described above.

Figure 17:
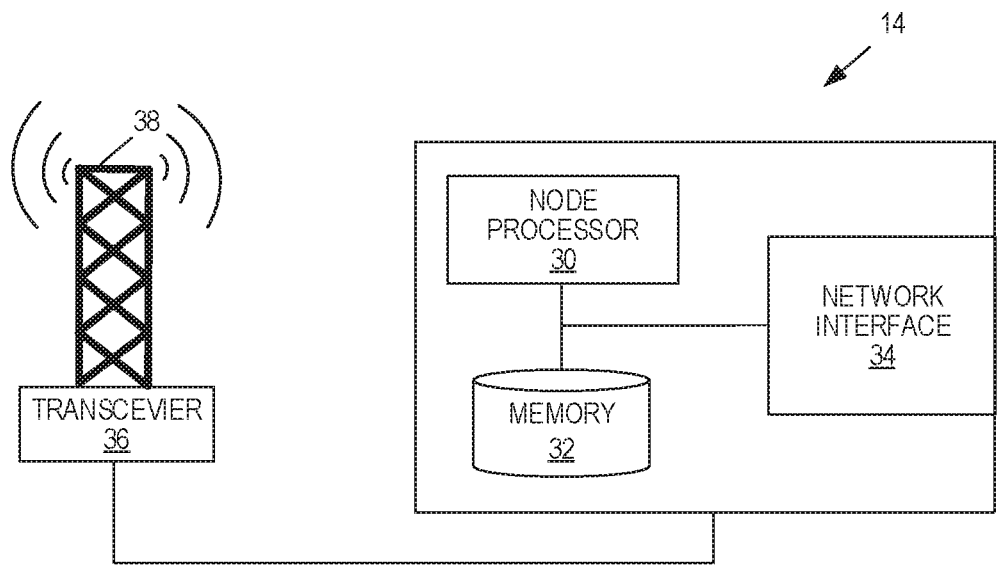
FIGS. 17 and 18 illustrate two example embodiments of a radio access node.

Referring to FIG. 17, a radio access node 14 comprises a node processor 30 (e.g., one or more CPUs, one or more ASICs, one or more FPGAs, or the like, or any combination thereof), memory 32, a network interface 34, a transceiver 36, and an antenna 38. In certain embodiments, some or all of the functionality described as being provided by a base station, a node B, an eNB, and/or any other type of network node may be provided by the node processor 30 executing instructions stored on a computer-readable medium, such as the memory 32 shown in FIG. 17. Alternative embodiments of the radio access node 14 may comprise additional components to provide additional functionality, such as the functionality described herein and/or related supporting functionality.

In some embodiments, a computer program including instructions which, when executed by at least one processor, causes the at least one processor to carry out the functionality of the radio access node 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 32).

Figure 18:
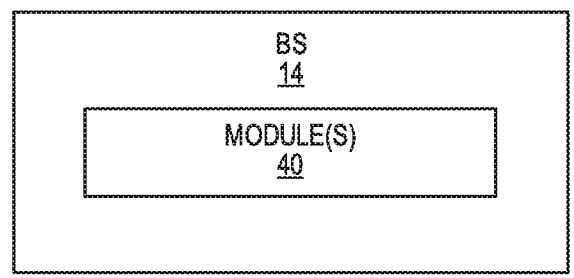

FIG. 18 illustrates a radio access node 14 according to some other embodiments of the present disclosure. As illustrated, the radio access node 14 includes one or more modules 40, each of which is implemented in software.

According to one aspect of the present disclosure, a method for relay selection in a wireless communication system including a first UE and a plurality of second UEs comprises:
 receiving a connection request from the first UE; and
 selecting one or more from the plurality of second UEs to respond to the connection request based on criteria associated with channel quality or message priority.

Preferably, in the above method, the first UE is out of coverage where the plurality of second UEs reside, and the connection request is responded to by sending a message from the selected second UEs to the first UE.

Preferably, in the above method, the first UE is within coverage where the plurality of second UEs reside, and the connection request is responded to by sending a message from the selected second UEs to a radio access node for the coverage.

Preferably, in the above method, the channel quality is channel quality on PC5.

Preferably, in the above method, the criteria associated with message priority is represented as a flag in the connection request.

According to another aspect of the present disclosure, a Relay UE in a wireless communication system, is characterized in being configured to:
 receive a connection request from a Remote UE; and
 respond to the connection request if criteria associated with channel quality or message priority is fulfilled.

While the disclosed subject matter has been presented above with reference to various embodiments, it will be understood that various changes in form and details may be made to the described embodiments without departing from the overall scope of the present disclosure.

The following acronyms are used throughout this disclosure.
- 3GPP Third Generation Partnership Project
- 5G Fifth Generation
- ACK Acknowledgement
- ASIC Application Specific Integrated Circuit
- CN Core Network
- CPU Central Processing Unit
- D2D Device-to-Device
- dBm Decibel-Milliwatt
- eNB Enhanced or Evolved Node B
- E-UTRAN Enhanced or Evolved Universal Terrestrial Radio Access Network
- EPC Evolved Packet Core
- EPS Evolved Packet System
- FPGA Field Programmable Gate Array
- IEEE Institute of Electrical and Electronics Engineers
- InC In-Coverage
- IP Internet Protocol
- LTE Long Term Evolution
- M2M Machine-to-Machine
- MAC Medium Access Control
- MME Mobility Management Entity
- MTC Machine Type Communication
- OoC Out-of-Coverage
- PDN Packet Data Network
- P-GW Packet Data Network Gateway
- ProSe Proximity Based Services
- RE Resource Element
- Rel-8 Release 8
- Rel-10 Release 10
- Rel-12 Release 12
- Rel-13 Release 13
- RRC Radio Resource Control
- RS Reference Signal
- RSRP Reference Signal Received Power
- RSRQ Reference Signal Received Quality
- SCEF Service Capability Exposure Function
- SL-DCH Sidelink Discovery Channel
- UE User Equipment
- UMTS Universal Mobile Telecommunications System Those skilled in the art will recognize improvements and modifications to the embodiments of the present disclosure. All such improvements and modifications are considered within the scope of the concepts disclosed herein and the claims that follow.

What is claimed is:

1. A method of operation of a relay wireless device in a cellular communications network, the relay wireless device being a wireless device having relay functionality, comprising:
   receiving a relay request from a remote wireless device, the remote wireless device being a wireless device desiring a connection to the cellular communications network via a relay wireless device;
   incrementing a counter;
   determining whether one or more criteria for acting on the relay request are satisfied, wherein the one or more criteria comprise a criterion that a radio channel quality of a communication channel between the remote wireless device and the relay wireless device is better than a predefined quality threshold;
   decreasing the predefined quality threshold if the counter is greater than a predefined counter threshold;
   acting on the relay request upon determining that the one or more criteria are satisfied, wherein acting on the relay request comprises acting on the relay request upon determining that the radio channel quality of the communication channel between the remote wireless device and the relay wireless device is better than the predefined quality threshold; and
   repeating the steps of incrementing the counter and decreasing the predefined quality threshold upon receiving each of one or more additional relay requests from the remote wireless device.

2. The method of claim 1, wherein the one or more criteria comprise a criterion that the relay wireless device has not already acted on a relay request from the remote wireless device such that the relay wireless device does not act on the relay request if the relay wireless device has already acted on a relay request from the remote wireless device.

3. The method of claim 1 wherein the one or more criteria comprise a criterion that the relay request was received on prioritized resources such that acting on the relay request comprises acting on the relay request upon determining that the relay request was received on prioritized resources.

4. The method of claim 1, wherein the one or more criteria comprise a criterion that the relay request comprises an indicator that the relay request is prioritized such that acting on the relay request comprises acting on the relay request upon determining that the relay request comprises an indicator that the relay request is prioritized.

5. The method of claim 1 further comprising decreasing the predefined quality threshold in response to receiving a predefined number of relay requests from the remote wireless device within a predefined amount of time.

6. The method of claim 1 further comprising:
   starting a timer upon receiving the relay request from the remote wireless device; and
   resetting the predefined quality threshold upon either expiry of the timer or acting on one of the relay requests received from the remote wireless device.

7. The method of claim 1, wherein acting on the relay request includes responding to the remote wireless device, and wherein the one or more criteria comprise a criterion that the relay wireless device is to respond to the relay request if: (a) a radio channel quality of the communication channel between the remote wireless device and the relay wireless device is worse than a first predefined quality threshold but better than a second predefined quality threshold and (b) another relay wireless device has not already responded to the relay request from the remote wireless device within a predefined amount of time.

8. The method of claim 1 further comprising:
   incrementing a counter upon receiving the relay request from the remote wireless device; wherein the one or more criteria comprise a criterion that the relay wireless device is to act on the relay request if the counter has reached a predefined maximum value.

9. The method of claim 1 further comprising refraining from acting on the relay request if the one or more criteria are not satisfied.

10. The method of claim 1, wherein acting on the relay request includes responding to the remote wireless device, and wherein responding to the remote wireless device comprises responding to the remote wireless device with a response that comprises an indication of one or more services provided by the relay wireless device.

11. The method of claim 1, wherein acting on the relay request includes reporting the relay request to a network node, wherein the one or more criteria comprise a criterion that a radio channel quality of a channel between the remote wireless device and a base station of the cellular communications network is better than a predefined quality threshold such that reporting the relay request to the network node comprises reporting the relay request to the network node upon determining that the radio channel quality of the channel between the remote wireless device and the base station of the cellular communications network is better than the predefined quality threshold.

12. The method of claim 1, wherein acting on the relay request includes
reporting the relay request to a network node, and wherein the one or more criteria comprise a criterion that: (a) a radio channel quality of a communication channel between the remote wireless device and the relay wireless device is better than a first predefined quality threshold and (b) a radio channel quality of a channel between the remote wireless device and a base station of the cellular communications network is better than a second predefined quality threshold such that reporting the relay request to the network node comprises reporting the relay request to the network node upon determining that (a) the radio channel quality of the communication channel between the remote wireless device and the relay wireless device is better than the first predefined quality threshold and (b) the radio channel quality of the channel between the remote wireless device and the base station of the cellular communications network is better than the predefined quality threshold.

13. A relay wireless device for a cellular communications network, the relay wireless device being a wireless device having relay functionality, comprising: a transceiver;
a processor; and
memory storing instructions executable by the processor whereby the relay wireless device is operable to:
receive, via the transceiver, a relay request from a remote wireless device, the remote wireless device being a wireless device desiring a connection to the cellular communications network via a relay wireless device;
incrementing a counter;
determine whether one or more criteria for acting on the relay request are satisfied, wherein the one or more criteria comprise a criterion that a radio channel quality of a communication channel between the remote wireless device and the relay wireless device is better than a predefined quality threshold;
decrease the predefined quality threshold if the counter is greater than a predefined counter threshold;
act on the relay request upon determining that the one or more criteria for responding to the relay request are satisfied, wherein the wireless relay device is operable to act on the relay request by acting on the relay request upon determining that the radio channel quality of the communication channel between the remote wireless device and the relay wireless device is better than the predefined quality threshold; and
repeat the operations of incrementing the counter and decreasing the predefined quality threshold upon receiving each of one or more additional relay requests from the remote wireless device.

14. A method of operation of a relay wireless device in a cellular communications network, the relay wireless device being a wireless device having relay functionality, comprising:
receiving a relay request from a remote wireless device, the remote wireless device being a wireless device desiring a connection to the cellular communications network via a relay wireless device:
determining whether one or more criteria for acting on the relay request are satisfied; and
acting on the relay request upon determining that the one or more criteria are satisfied, wherein acting on the relay request includes reporting the relay request to a network node, and wherein the one or more criteria comprise a criterion that: (a) a radio channel quality of a communication channel between the remote wireless device and the relay wireless device is better than a first predefined quality threshold and (b) a radio channel quality of a channel between the remote wireless device and a base station of the cellular communications network is better than a second predefined quality threshold such that reporting the relay request to the network node comprises reporting the relay request to the network node upon determining that (a) the radio channel quality of the communication channel between the remote wireless device and the relay wireless device is better than the first predefined quality threshold and (b) the radio channel quality of the channel between the remote wireless device and the base station of the cellular communications network is better than the predefined quality threshold.

15. The method of claim 14, wherein the one or more criteria comprise a criterion that the relay wireless device has not already acted on a relay request from the remote wireless device such that the relay wireless device does not act on the relay request if the relay wireless device has already acted on a relay request from the remote wireless device.

16. The method of claim 14 wherein the one or more criteria comprise a criterion that the relay request was received on prioritized resources such that acting on the relay request comprises acting on the relay request upon determining that the relay request was received on prioritized resources.

17. The method of claim 14, wherein the one or more criteria comprise a criterion that the relay request comprises an indicator that the relay request is prioritized such that acting on the relay request comprises acting on the relay request upon determining that the relay request comprises an indicator that the relay request is prioritized.

18. The method of claim 14, wherein acting on the relay request includes responding to the remote wireless device, and wherein the one or more criteria comprise a criterion that the relay wireless device is to respond to the relay request if: (a) a radio channel quality of the communication channel between the remote wireless device and the relay wireless device is worse than a first predefined quality threshold but better than a second predefined quality threshold and (b) another relay wireless device has not already responded to the relay request from the remote wireless device within a predefined amount of time.

19. The method of claim 14 further comprising:
incrementing a counter upon receiving the relay request from the remote wireless device; wherein the one or more criteria comprise a criterion that the relay wireless device is to act on the relay request if the counter has reached a predefined maximum value.

20. The method of claim 14 further comprising refraining from acting on the relay request if the one or more criteria are not satisfied.

21. The method of claim 14, wherein acting on the relay request includes responding to the remote wireless device, and wherein responding to the remote wireless device comprises responding to the remote wireless device with a response that comprises an indication of one or more services provided by the relay wireless device.

22. A relay wireless device for a cellular communications network, the relay wireless device being a wireless device having relay functionality, comprising: a transceiver;
a processor; and
memory storing instructions executable by the processor whereby the relay wireless device is operable to:
receive, via the transceiver, a relay request from a remote wireless device, the remote wireless device being a wireless device desiring a connection to the cellular communications network via a relay wireless device;
determine whether one or more criteria for acting on the relay request are satisfied; and
act on the relay request upon determining that the one or more criteria for responding to the relay request are satisfied, wherein the relay wireless device is operable to act on the relay request by reporting the relay request to a network node, and wherein the one or more criteria comprise a criterion that: (a) a radio channel quality of a communication channel between the remote wireless device and the relay wireless device is better than a first predefined quality threshold and (b) a radio channel quality of a channel between the remote wireless device and a base station of the cellular communications network is better than a second predefined quality threshold such that reporting the relay request to the network node comprises reporting the relay request to the network node upon determining that (a) the radio channel quality of the communication channel between the remote wireless device and the relay wireless device is better than the first predefined quality threshold and (b) the radio channel quality of the channel between the remote wireless device and the base station of the cellular communications network is better than the predefined quality threshold.

* * * * *